US012699884B2

(12) United States Patent　　　(10) Patent No.:　US 12,699,884 B2
Watanabe　　　　　　　　　　　　　(45) Date of Patent:　　　Aug. 4, 2026

(54) DATA PROCESSING DEVICE, DATA PROCESSING METHOD, AND COMPUTER-READABLE RECORDING MEDIUM STORING DATA PROCESSING PROGRAM

(71) Applicant: Fujitsu Limited, Nakahara-ku (JP)

(72) Inventor: Yasuhiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 616 days.

(21) Appl. No.: 18/346,459

(22) Filed: Jul. 3, 2023

(65) Prior Publication Data

US 2024/0135151 A1　　Apr. 25, 2024
US 2024/0232588 A9　　Jul. 11, 2024

(30) Foreign Application Priority Data

Oct. 25, 2022　　(JP) ................................. 2022-170388

(51) Int. Cl.
*G06N 20/00*　　　　(2019.01)
*G06N 3/0475*　　　(2023.01)
(52) U.S. Cl.
CPC .................................. *G06N 3/0475* (2023.01)
(58) Field of Classification Search
None
See application file for complete search history.

(56) References Cited

U.S. PATENT DOCUMENTS

2017/0116159 A1　　4/2017　Hamze et al.
2017/0351947 A1　　12/2017　Tamura et al.

2020/0380346 A1　　12/2020　Tsukamoto et al.
2020/0401738 A1　　12/2020　Tamura
2021/0256090 A1　　8/2021　Yasuhiro
2021/0303754 A1　　9/2021　Kanda et al.

FOREIGN PATENT DOCUMENTS

JP　　2017-219948　　12/2017
JP　　2020-194442　　12/2020
JP　　2021-131695　　9/2021

OTHER PUBLICATIONS

Extended European Search Report dated Apr. 8, 2024 for corresponding European Patent Application No. 23183836.8, 10 pages.
* Please note US-2021-0256090-A1 cited herewith, was previously cited in and IDS filed on Jul. 3, 2023.*.

*Primary Examiner* — David R Vincent
(74) *Attorney, Agent, or Firm* — Fujitsu Intellectual Property Center

(57)　　　　　　　　ABSTRACT

A data processing method including: upon switching an object to a first group among groups of an Ising model when a search for a solution to a problem represented by the Ising model is performed by switching to each of the groups obtained by dividing the state variables, reading first weighting factors corresponding to pairs of the state variables whose values have changed and each first state variable belonging to the first group; updating a local field of the first state variable; executing the search on the first group by using second weighting factors and the local field of the first state variable; and after ending the search on the first group, updating the change information according to presence or absence of a change in the values for the first state variable by the search at a current time, to switch the object to be searched to a next group.

7 Claims, 20 Drawing Sheets

FIG. 4

● STATE VARIABLE THAT HAS CHANGED

○ STATE VARIABLE THAT HAS NOT CHANGED

WEIGHTING FACTORS FOR USE IN SEARCH ON CURRENT WINDOW

WEIGHTING FACTORS FOR USE IN LOCAL FIELD UPDATE

WEIGHTING FACTORS FOR USE IN SEARCH ON NEXT WINDOW

WEIGHTING FACTORS FOR USE IN LOCAL FIELD UPDATE

FIG. 16

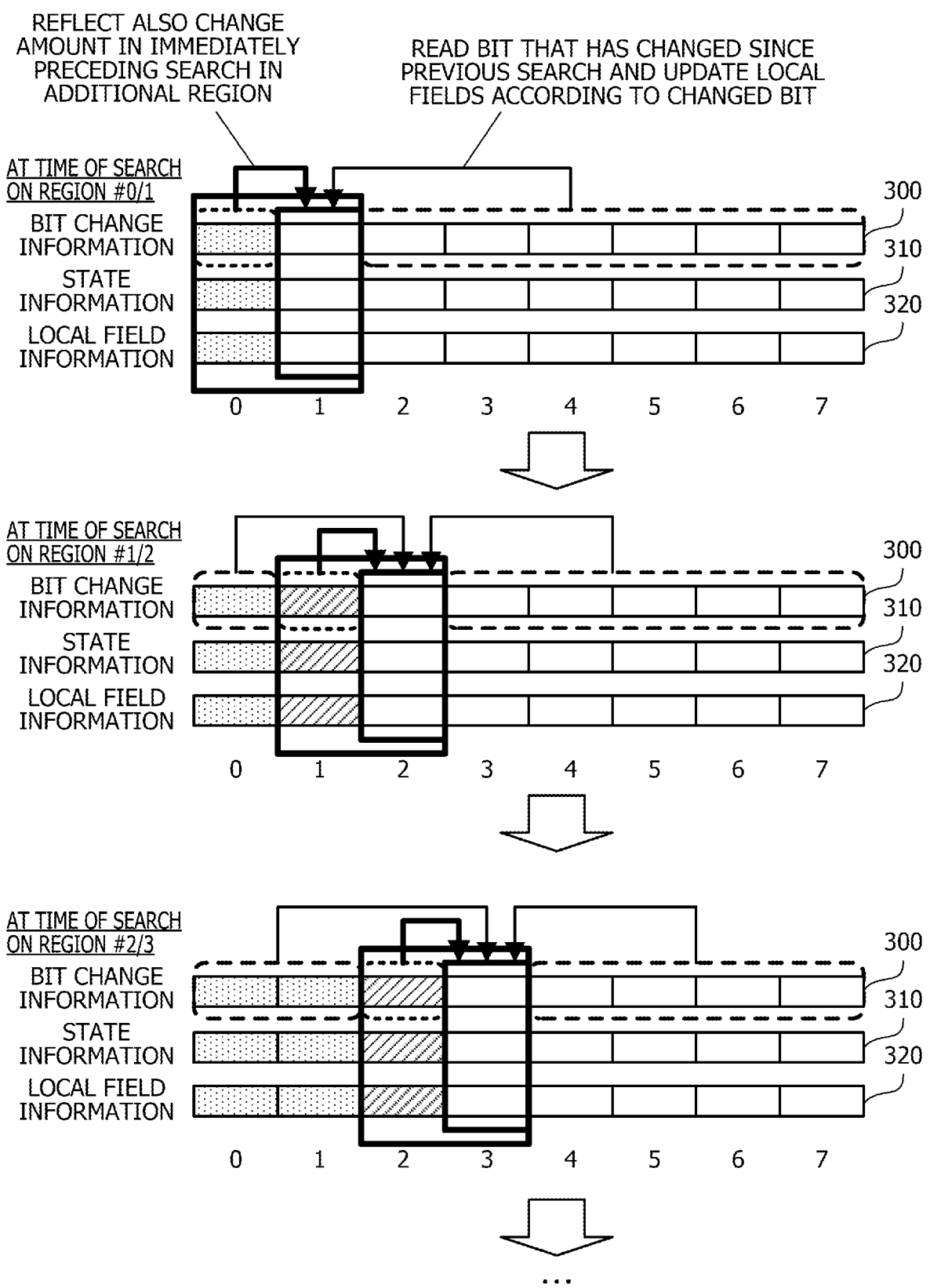

REFLECT ALSO CHANGE
AMOUNT IN IMMEDIATELY
PRECEDING SEARCH IN
ADDITIONAL REGION

READ BIT THAT HAS CHANGED SINCE
PREVIOUS SEARCH AND UPDATE LOCAL
FIELDS ACCORDING TO CHANGED BIT

AT TIME OF SEARCH
ON REGION #0/1

BIT CHANGE
INFORMATION

STATE
INFORMATION

LOCAL FIELD
INFORMATION 300
310
320

0    1    2    3    4    5    6    7

AT TIME OF SEARCH
ON REGION #1/2

BIT CHANGE
INFORMATION

STATE
INFORMATION

LOCAL FIELD
INFORMATION 300
310
320

0    1    2    3    4    5    6    7

AT TIME OF SEARCH
ON REGION #2/3

BIT CHANGE
INFORMATION

STATE
INFORMATION

LOCAL FIELD
INFORMATION 300
310
320

0    1    2    3    4    5    6    7

. . .

1

DATA PROCESSING DEVICE, DATA PROCESSING METHOD, AND COMPUTER-READABLE RECORDING MEDIUM STORING DATA PROCESSING PROGRAM

CROSS-REFERENCE TO RELATED APPLICATION

This application is based upon and claims the benefit of priority of the prior Japanese Patent Application No. 2022-170388, filed on Oct. 25, 2022, the entire contents of which are incorporated herein by reference.

FIELD

The embodiments discussed herein are related to a data processing device, a data processing method, and a non-transitory computer-readable recording medium storing a data processing program.

BACKGROUND

There is an Ising machine that calculates a multivariable combinatorial optimization problem, which the von Neumann computer is not good at, by replacing the combinatorial optimization problem with an Ising model, which is a model representing the behavior of spins in a magnetic material. The Ising machine is also called a Boltzmann machine. Techniques for solving the problem replaced with the Ising model in a practical time include, for example, a simulated annealing (SA) method and a replica exchange method based on a Markov Chain Monte Carlo (MCMC) method.

The combinatorial optimization problem is formulated with an energy function containing a plurality of state variables. For example, the Ising machine searches for a ground state of the Ising model that minimizes a value of the energy function, by repeatedly trying state transitions caused by changing the values of the state variables using the MCMC method. The ground state corresponds to an optimal solution of the combinatorial optimization problem.

For example, an optimization device that solves a combinatorial optimization problem by dividing the combinatorial optimization problem into a plurality of subproblems and finds a solution to the whole problem based on the solutions to the subproblems has been proposed. The proposed optimization device includes a plurality of Ising devices each searching for a solution to any one subproblem of the plurality of subproblems.

In addition, an information processing device including a plurality of Ising devices has also been proposed. In this proposal, the Ising device includes a plurality of neuron circuits that perform processing relating to one bit and reflects a neuron state of another Ising device obtained via a router in its own neuron circuits.

In addition, there is also a proposal of an optimization device that lessens the capacity of a storage unit of a neuron circuit by holding, in the neuron circuit, only a weighting factor between the neuron circuit and a connection destination neuron connected to a neuron of interest, among the whole weighting factors indicating the strength of connection between neurons.

Note that there is a proposal for a calculation system that executes SA on a sample output from an analog processor including a quantum bit, with an annealing schedule in a reverse direction, and calculates a weight of a sample used for importance sampling, using the history of the executed SA.

Japanese Laid-open Patent Publication No. 2021-131695, Japanese Laid-open Patent Publication No. 2017-219948, Japanese Laid-open Patent Publication No. 2020-194442, and U.S. Patent Application Publication No. 2017/0116159 are disclosed as related art.

SUMMARY

According to an aspect of the embodiments, there is provided a data processing device including: a memory; and a processor coupled to the memory, the processor being configured to perform a search for a solution to a problem represented by an Ising model that includes a plurality of state variables, by switching to each of a plurality of groups obtained by dividing the plurality of state variables, wherein the processor performs processing including: when switching an object intended to be searched to a first group among the plurality of groups, based on change information that indicates the state variables whose values have changed by the search on another group apart from the first group after the search at a previous time on the first group, reading first weighting factors that correspond to pairs of the state variables whose values have changed and each of a plurality of first state variables that belong to the first group, from a storage device that stores whole weighting factors that relate to the plurality of state variables, to store the read first weighting factors in the memory; updating a local field of each of the plurality of first state variables, based on the first weighting factors stored in the memory; reading second weighting factors that correspond to the pairs of the first state variables within the plurality of first state variables, from the memory, to store the read second weighting factors stored in the memory; executing the search on the first group by using the second weighting factors and the local field of each of the plurality of first state variables stored in the memory; and after ending the search on the first group, updating the change information according to presence or absence of a change in the values for each of the plurality of first state variables by the search at a current time, to switch the object intended to be searched to a next group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a search by the Ising machine;

FIG. 16 is a diagram illustrating an example of forward sliding with overlap;

DESCRIPTION OF EMBODIMENTS

In finding a solution to the problem replaced with the Ising model, weighting factors representing the magnitude of the interaction between respective state variables are used. As the number of state variables increases as the problem scale becomes larger, the number of weighting factors also rises. For this reason, there is a possibility that all weighting factors are not allowed to be stored in a storage unit used as a cache by an arithmetic unit that executes solution finding.

By dividing the problem into a plurality of subproblems and finding a solution by focusing on a group of state variables corresponding to a subproblem among the whole state variables, the weighting factors held in the storage unit can be lessened. Thus, for example, a method is conceivable in which the whole weighting factors are stored in a large-capacity storage device, information on the subproblems is transferred to a storage unit for use as a cache from the storage device, and calculation is performed by appropriately substituting the subproblems to be transferred, for each other. However, in this method, it takes time to read the weighting factors into the storage unit and to update the local fields used for calculating the amount of change in the value of the energy function, which occur due to the substitution of the subproblems.

In one aspect, an object of the embodiments is to efficiently switch between groups of state variables intended to be searched.

Hereinafter, the present embodiments will be described with reference to the drawings.

First Embodiment

A first embodiment will be described.

Figure 1:
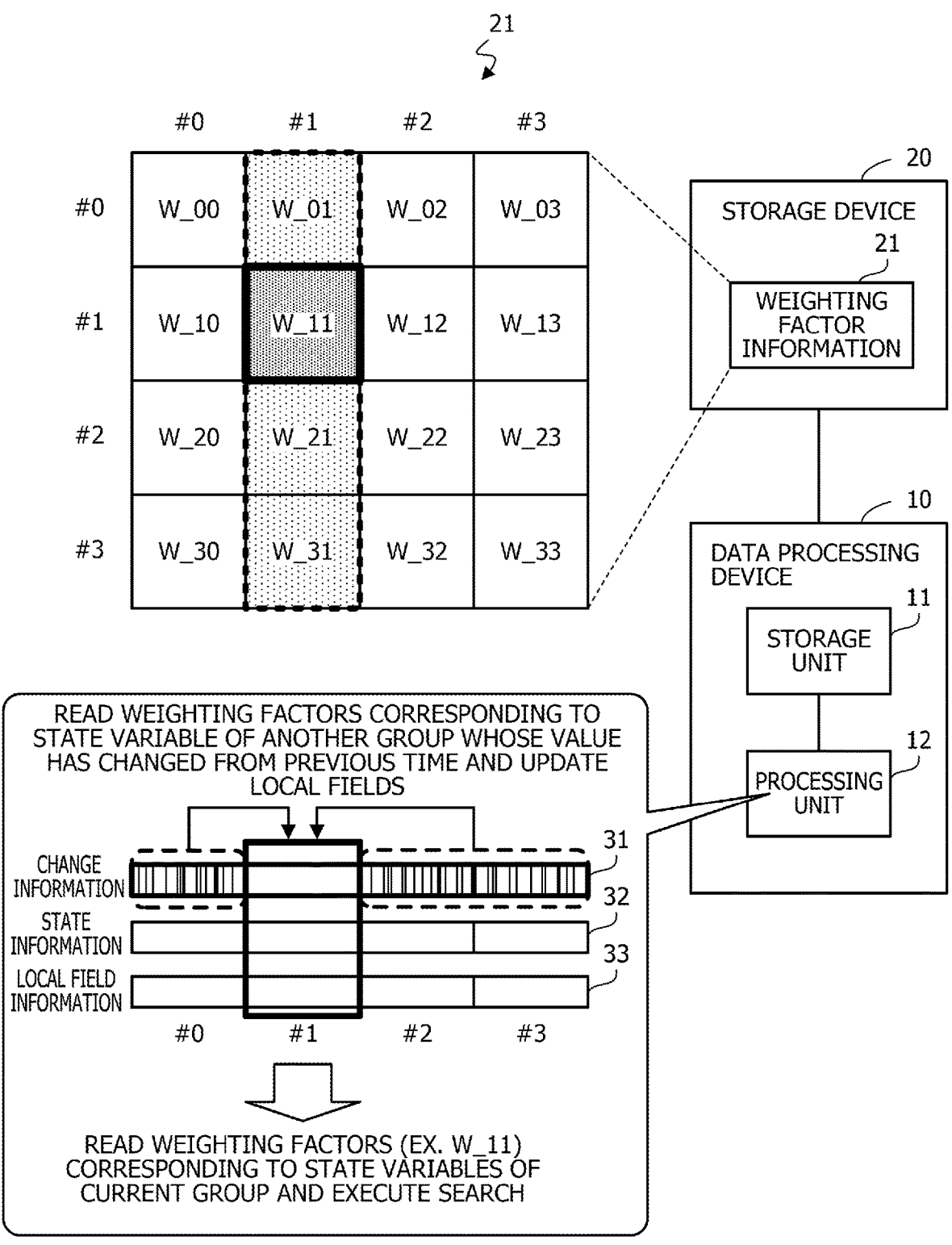
FIG. 1 is a diagram explaining a data processing device according to a first embodiment.

FIG. 1 is a diagram explaining a data processing device according to the first embodiment.

A data processing device 10 searches for a solution to a combinatorial optimization problem, using the MCMC method, and outputs a solution found by the search. For example, the data processing device 10 uses an SA method, a parallel tempering (PT) method, and the like based on the MCMC method to search for a solution. The PT method is also called a replica exchange method. The data processing device 10 includes a storage unit 11 and a processing unit 12. In addition, the data processing device 10 is coupled to a storage device 20.

The storage unit 11 is a cache memory that holds data used for arithmetic operations of the processing unit 12. The storage unit 11 is, for example, a static random access memory (SRAM). The storage unit 11 may include an electronic circuit such as a register. The storage unit 11 may be an internal memory located inside the processing unit 12. For example, the processing unit 12 is a processor such as a central processing unit (CPU), a graphics processing unit (GPU), a digital signal processor (DSP), an application specific integrated circuit (ASIC), or a field programmable gate array (FPGA). The processing unit 12 may be a processor that executes a program.

The storage device 20 is coupled to the data processing device 10 and stores data used for processing of the data processing device 10. The storage capacity of the storage device 20 is larger than the storage capacity of the storage unit 11. The storage device 20 is, for example, a dynamic random access memory (DRAM). As an interface coupling the storage device 20 and the data processing device 10, for example, a high bandwidth memory (HBM2) interface or the like is used.

Here, the combinatorial optimization problem is formulated by an Ising-type energy function and is replaced with a problem to minimize the value of the energy function, for example. The energy function is sometimes also called an objective function, an evaluation function, or the like. The energy function includes a plurality of state variables. The state variable is a binary variable that takes a value of 0 or 1. The state variable may be referred to as a bit. The solution to the combinatorial optimization problem is represented by the values of a plurality of state variables. A solution that minimizes the value of the energy function represents a ground state of an Ising model and corresponds to an optimal solution to the combinatorial optimization problem. The value of the energy function is simply referred to as energy.

The Ising-type energy function is represented by formula (1).

[Mathematical Formula 1]

$$E(x) = -\sum_{\langle i,j \rangle} W_{ij} x_i x_j - \sum_i b_i x_i \tag{1}$$

A state vector x has a plurality of state variables as elements and represents the state of the Ising model. Formula (1) is an energy function formulated in a quadratic unconstrained binary optimization (QUBO) format. Note that, in the case of a problem to maximize the energy, it is sufficient to reverse the signs of the energy function.

The first term on the right side of formula (1) is to integrate products of the values of two state variables and a weighting factor without omission and duplication for all combinations of two state variables selectable from among all state variables. The subscripts i and j denote indices of the state variables. An i-th state variable is denoted by $x_i$. A j-th state variable is denoted by $x_j$. A weight between the i-th state variable and the j-th state variable or a weighting factor indicating strength of connection is denoted by $W_{ij}$. $W_{ij}=W_{ji}$ and $W_{ii}=0$ are met.

The second term on the right side of formula (1) is to find a total sum of products of respective biases for all state variables and the values of the state variables. A bias for the i-th state variable is indicated by bi. When the value of the state variable $x_i$ changes to $1-x_i$, the increment of the state variable $x_i$ can be represented as $\Delta x_i=(1-x_i)-x_i=1-2x_i$. A neighboring state $x^{(i)}$ obtained by inverting the state variable $x_i$ from a certain state x is represented by formula (2). The subscript "Tr" in formula (2) indicates transposition.

[Mathematical Formula 2]

$$x^{(i)}=(x_1, \ldots, x_i+\Delta x_i, \ldots, x_N)^{Tr} \tag{2}$$

For an energy function E(x), the amount of change $\Delta E_i$ in energy due to a change in the state variable $x_i$ is represented by formula (3).

[Mathematical Formula 3]

$$\begin{aligned} \Delta E_i &= E(x)|_{x_i \to 1-x_i} - E(x) \\ &= -\Delta x_i \left( \sum_j W_{ij}x_j + b_i \right) \\ &= -\Delta x_i h_i \\ &= \begin{cases} -h_i & \text{for } x_i = 0 \to 1 \\ +h_i & \text{for } x_i = 1 \to 0 \end{cases} \end{aligned} \tag{3}$$

The reference sign $h_i$ is called a local field and is represented by formula (4). The local field is sometimes also referred to as an LF.

[Mathematical Formula 4]

$$h_i = \sum_j W_{ij}x_j + b_i \tag{4}$$

A change amount $\Delta h_i^{(j)}$ of the local field $h_i$ when the state variable $x_j$ changes is represented by formula (5).

[Mathematical Formula 5]

$$\Delta h_i^{(j)} = \begin{cases} +W_{ij} & \text{for } x_j = 0 \to 1 \\ -W_{ij} & \text{for } x_j = 1 \to 0 \end{cases} \tag{5}$$

The processing unit 12 obtains $h_i$ corresponding to the state after bit inversion by adding the change amount $\Delta h_i^{(j)}$ to $h_i$ when the value of the state variable $x_j$ changes. The local field $h_i$ after the change of the value of the state variable $x_j$ is represented by formula (6).

[Mathematical Formula 6]

$$h_i \leftarrow h_i + W_{ij}\Delta x_j \tag{6}$$

A Metropolis method and a Gibbs method are used to determine whether or not to permit a state transition, that is, a change in the value of the state variable $x_i$, that gives an energy change of $\Delta E_i$ in the search for a ground state. Specifically, in neighbor search for searching for a transition from a certain state to another state in which energy is lower than the energy in the certain state, a transition to not only a state in which energy is decreased but also a state in which energy is raised is stochastically permitted. For example, a probability A of accepting the change in the value of the state variable with the energy change $\Delta E$ is represented by formula (7).

[Mathematical Formula 7]

$$A(\Delta E) = \begin{cases} \min[1, \exp(-\beta \cdot \Delta E)] & \text{Metropolis} \\ 1/[1 + \exp(\beta \cdot \Delta E)] & \text{Gibbs} \end{cases} \tag{7}$$

The reciprocal of a temperature value T (T>0) is indicated by $\beta$ ($\beta=1/T$) and is called an inverse temperature. The min operator indicates that a minimum value of arguments is taken. The upper right side of formula (7) corresponds to the Metropolis method. The lower right side of formula (7) corresponds to the Gibbs method. The processing unit 12 compares A with a uniform random number u where $0<u<1$ is met with respect to a certain index i and, when $u<A$ is met, accepts the change in the value of the state variable $x_i$ to change the value of the state variable $x_i$. When $u<A$ is not met, the processing unit 12 does not accept the change in the value of the state variable $x_i$ and does not change the value of the state variable $x_i$. According to the formula (7), the larger the value of $\Delta E$ is, the smaller A becomes. In addition, the smaller $\beta$, that is, the larger T, the more easily a state transition with larger $\Delta E$ is permitted.

The processing unit 12 can speed up solution search by determining a state variable whose value is to be changed by parallel trials for a plurality of state variables. For example, the processing unit 12 calculates $\Delta E$ for a plurality of state variables in parallel. Then, the processing unit 12 selects a state variable whose value is to be changed from among the state variables satisfying formula (7), using a random number or the like. The processing unit 12 changes the value of the selected state variable and also updates the local fields of the other state variables in parallel according to the change.

Here, by dividing the combinatorial optimization problem into subproblems and causing the data processing device 10 to execute solution finding while switching between the subproblems, the size of the weighting factors supposed to be held by the storage unit 11 to find a solution can be reduced, and a large-scale problem can be processed. Weighting factor information 21 that has the whole weighting factors corresponding to the combinatorial optimization problem is held in the storage device 20. For the number N of all state variables (N is an integer equal to or greater than two), the energy function for the combinatorial optimization problem is represented by formula (8).

[Mathematical Formula 8]

$$E(x) = -\sum_{\langle i,j \rangle}^{N} W_{ij}x_ix_j - \sum_{i=1}^{N} b_ix_i + c \tag{8}$$

Meanwhile, an energy function for a subproblem that deals with a group of state variables of i=1 to K (K<N), which is a part of the N state variables, is defined by an energy function E'(x) of formula (9).

[Mathematical Formula 9]

$$E'(x) = -\sum_{\langle i,j \rangle}^{K} W_{ij}x_ix_j - \sum_{i=1}^{K} b_i'x_i + c' \tag{9}$$

In formula (9), $b'_i$ and $c'$ are represented as formulas (10) and (11), respectively.

[Mathematical Formula 10]

$$b'_i = b_i + \sum_{j=K+1}^{N} W_{ij}x_j \qquad (10)$$

[Mathematical Formula 11]

$$c' = c - \sum_{i=K+1}^{N} b_i x_i - \sum_{i=K+1}^{N} \sum_{j>i}^{N} W_{ij}x_i x_j \qquad (11)$$

At the time of searching for a solution to the subproblem corresponding to the group of the state variables of i=1 to K (K<N), the values of state variables of i=K+1 to N are fixed. The second term on the right side of formula (10) represents a contribution to a bias factor by the state variables having the fixed values. The second term and the third term on the right side of formula (11) represent a contribution to a constant by the state variables having the fixed values. In one example, the N state variables are divided into n (n is an integer equal to or greater than two) groups each having K state variables. The set of state variables belonging to one group is a subset of the whole state variables corresponding to the entire problem.

As an example, FIG. 1 exemplifies the case of n=4, that is, a case where the whole state variables for the problem are divided into four without duplication. In this case, the whole state variables are divided into groups #0, #1, #2, and #3. For example, the whole weighting factors are split into W_00, W_10, W_20, W_30, W_01, W_11, W_21, W_31, W_02, W_12, W_22, W_32, W_03, W_13, W_23, and W_33. Here, the numerical values after the underscore "_" of the reference sign of the weighting factor indicate the following index ranges relating to the state variables. "0" denotes 1 to K. "1" denotes K+1 to 2K. "2" denotes 2K+1 to 3K. "3" denotes 3K+1 to N. For example, W_00 denotes the portion {$W_{ij}$} ($1 \leq i \leq K$, $1 \leq j \leq K$) of the whole weighting factors W. Note that the entire problem can also be divided into a plurality of subproblems with duplication between state variables.

In this manner, by dividing the problem represented by the Ising model, that is, the Ising problem, into a plurality of subproblems, the processing unit 12 can search for a solution to the problem while switching between the subproblems intended to be searched. The switching between the subproblems intended to be searched corresponds to the switching between groups of the state variables intended to be searched. For example, the processing unit 12 executes the following processing when switching the object intended to be searched to a first group among a plurality of groups.

First, the processing unit 12 acquires change information 31. The change information 31 indicates a state variable whose value has changed by a search on another group after the previous search on the first group, among a plurality of state variables corresponding to the entire problem. The change information 31 may be stored in the storage device 20 or may be stored in the storage unit 11.

For example, when the first group is the group #1, the change information 31 indicates a state variable of another group whose value has changed after the previous search on the group #1, among the state variables belonging to the groups #0, #2, and #3. Note that, in this case, the group #1 corresponds to the group of the state variables currently intended to be searched. In addition, the groups #0, #2, and #3 are other groups than the group #1.

Based on the change information 31, the processing unit 12 reads, from the storage device 20, first weighting factors corresponding to pairs of a state variable of another group whose value has changed after the previous search on the first group, and each of a plurality of first state variables included in the first group, and stores the read first weighting factors in the storage unit 11.

For example, regarding the group #1 as an object currently intended to be searched, the processing unit 12 reads only the first weighting factors relating to the state variable of another group whose value has changed after the previous search on the first group, among the weighting factors W_01, W_21, and W_31, based on the change information 31. In the change information 31 in FIG. 1, the horizontal direction indicates the index, and the state variables whose values have changed after the previous search on the first group are indicated by the vertical solid lines written at the index positions corresponding to the state variables of the other groups.

The processing unit 12 updates the local field of each of the plurality of first state variables, based on the first weighting factors stored in the storage unit 11. For example, the processing unit 12 can update the local field of each of the plurality of first state variables by formula (6), based on the first weighting factors and the values of a plurality of state variables after the previous search on the first group, that is, the values of all the N state variables, and the change information 31.

Note that the processing unit 12 acquires the values of the plurality of state variables after the previous search on the first group, based on state information 32 corresponding to the first group. For example, the state information 32 is stored in the storage device 20 or the storage unit 11 for each group of state variables. The state information 32 holds the values of the whole state variables after the previous search on the relevant group. The state information 32 is used together with the change information 31 to specify a direction of change in the value of the state variable, that is, whether the change is from 0 to 1 or the change is from 1 to 0. However, the storage unit 11 may hold the latest values of all state variables, and in this case, the processing unit 12 may specify the direction of change of the state variable whose value has changed from the time of the previous search, from the latest values of all state variables and the change information 31.

In addition, the local field of each state variable is held in local field information 33. The local field information 33 is held in the storage device 20 or the storage unit 11. When the local field information 33 is held in the storage device 20, it is sufficient for the processing unit 12 to read only the local field of each of the plurality of first state variables included in the first group, from the storage device 20, and store the read local fields in the storage unit 11.

The processing unit 12 reads second weighting factors corresponding to pairs of the first state variables within the plurality of first state variables, from the storage device 20, and stores the read second weighting factors in the storage unit 11. For example, the processing unit 12 reads the weighting factors W_11 corresponding to the first state variables of the group #1 as an object currently intended to be searched, into the storage unit 11 from the storage device 20.

The processing unit 12 executes a search on the first group, using the second weighting factors and the local field of each of the plurality of first state variables stored in the storage unit 11.

Then, the processing unit 12 ends the search on the first group. The processing unit 12 then updates the change information 31 according to the presence or absence of a change in the value of each of the plurality of first state variables by the current search and performs a search based on the next group among the plurality of groups. For example, regarding the group #1 on which the current search has been performed, information indicating whether or not the value has changed by the current search is added to the change information 31 for each first state variable. The updated change information 31 is used to update the local fields of the state variables belonging to another group before the search on the another group, similarly to the above processing for the first group.

Note that, for example, after ending the search on the first group, the processing unit 12 updates the state information 32 corresponding to the first group with the latest values of all the state variables after the current search and saves the updated state information 32 in the storage device 20. The saved state information 32 is used when a search on the first group is performed next time. In addition, when the local field information 33 is held in the storage device 20, the processing unit 12 reflects the local field of each of the plurality of first state variables included in the first group in the local field information 33 in the storage device 20 and updates the local field information 33 to the latest state.

In this way, the processing unit 12 executes solution finding by the SA method or the replica exchange method for a predetermined period while switching between the groups of the state variables intended to be searched and outputs a solution with the lowest energy obtained by the search.

As described above, according to the data processing device 10, a search for a solution to a problem represented by the Ising model including a plurality of state variables is performed by switching to each of the plurality of groups obtained by dividing the plurality of state variables. When the object intended to be searched is switched to the first group among the plurality of groups, the following processing is executed. Based on the change information 31 indicating a state variable whose value has changed by a search on another group apart from the first group after the previous search on the first group, the first weighting factors corresponding to pairs of the state variable and each of the plurality of first state variables belonging to the first group are read from the storage device 20 that stores the whole weighting factors relating to the plurality of state variables. The read first weighting factors are stored in the storage unit 11. The local field of each of the plurality of first state variables is updated based on the first weighting factors stored in the storage unit 11. The second weighting factors corresponding to pairs of the first state variables within the plurality of first state variables are read from the storage device 20, and the read second weighting factors are stored in the storage unit 11. A search on the first group is executed using the second weighting factors and the local field of each of the plurality of first state variables stored in the storage unit 11. After the search on the first group ends, the change information 31 is updated according to the presence or absence of a change in the value of each of the plurality of first state variables by the current search, and the object intended to be searched is switched to the next group.

This may allow the data processing device 10 to efficiently switch between the groups of state variables intended to be searched. For example, based on the change information 31, the data processing device 10 can narrow the weighting factors to be read from the storage device 20 to the first weighting factors related to the state variable of another group whose value has changed from the time of the previous search on the first group.

As a method of a comparative example, a method is also conceivable in which subproblems are switched by reading all the weighting factors related to the plurality of first state variables belonging to the first group into the storage unit 11 from the storage device 20 and recalculating formulas (10) and (11). However, the method of the comparative example has a large amount of reading for the weighting factors and a large amount of calculation pertaining to the read weighting factors and involves large overhead at the time of switching.

In contrast to this, according to the data processing device 10, the weighting factors intended to be read are narrowed down by the change information 31, whereby the amount of reading for the weighting factors from the storage device 20 into the storage unit 11 may be reduced. In addition, the time taken to read the weighting factors into the storage unit 11 from the storage device 20 may be reduced. Furthermore, it is sufficient for the data processing device 10 to reflect only the influence of a state variable of another group whose value has changed, in the local fields of the first state variables, by formula (6), using the first weighting factors read into the storage unit 11. Therefore, the time taken to update the local fields may be reduced. In this way, switching between the groups of the state variables intended to be searched, that is, switching between the subproblems may be made efficient.

By reducing the overhead at the time of switching between the subproblems, the solution performance of the data processing device 10 may be improved. For example, the time for finding a solution may be shortened. In addition, the possibility of obtaining a better solution in a relatively short time may be enhanced. Furthermore, the storage capacity desirable for the storage unit 11 may be reduced, and the solution may be found with a relatively small storage capacity.

Second Embodiment

Next, a second embodiment will be described.

Figure 2:
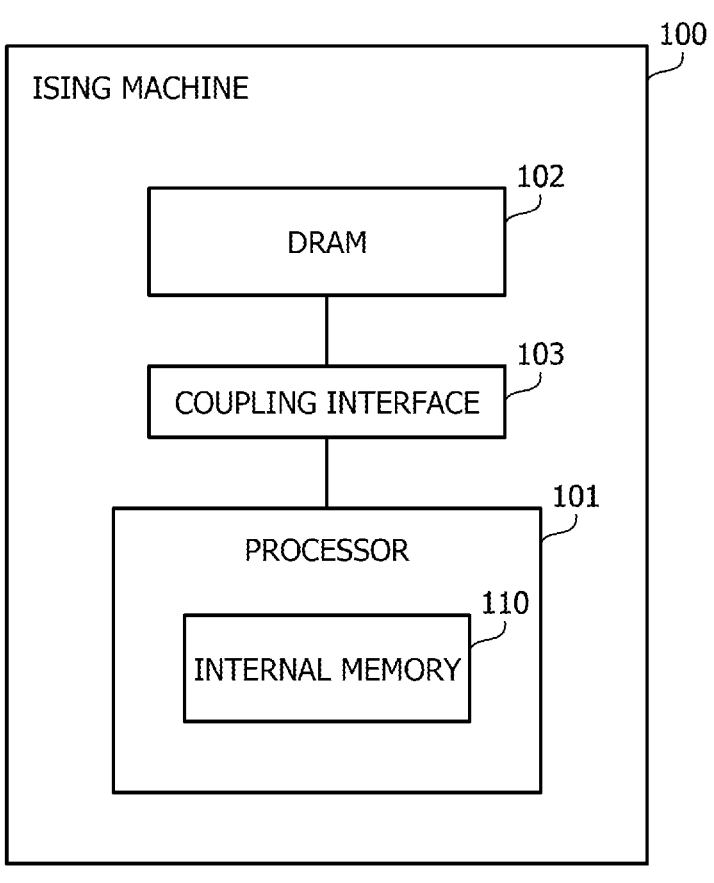
FIG. 2 is a diagram illustrating a hardware example of an Ising machine according to a second embodiment.

FIG. 2 is a diagram illustrating a hardware example of an Ising machine according to the second embodiment.

An Ising machine 100 includes a processor 101, a DRAM 102, and a coupling interface 103.

The processor 101 is an arithmetic device that executes solution finding for a combinatorial optimization problem. For example, the processor 101 is a CPU, a GPU, an ASIC, an FPGA, or the like. The processor 101 is an example of the processing unit 12 according to the first embodiment. The processor 101 includes an internal memory 110.

The internal memory 110 is used as a cache memory for the processor 101. The internal memory 110 is, for example, an SRAM. The internal memory 110 is an example of the storage unit 11 according to the first embodiment.

The DRAM 102 is a main storage device of the Ising machine 100. The DRAM 102 has a larger capacity than the internal memory 110 and holds information such as the whole weighting factors used for finding a solution. The DRAM 102 is an example of the storage device 20 according to the first embodiment.

The coupling interface 103 is an interface that couples the processor 101 and the DRAM 102 and is used for data transfer. For example, an HBM2 interface or the like is used as the coupling interface 103.

Note that the Ising machine 100 is an example of the data processing device 10 according to the first embodiment.

The processor 101 executes solution finding based on a plurality of subproblems obtained by dividing a combinatorial optimization problem. In this case, for example, the N state variables included in formula (8) of the Ising-type energy function are divided into n groups each having K state variables. One subproblem corresponds to one group of state variables. The processor 101 switches between the subproblems, that is, switches to a group intended to be searched and executes a search for a solution on the group intended to be searched. To find a solution, the SA method or the replica exchange method is used. Note that the group of state variables is a subset of the whole state variables and may be referred to as a partial region.

Figure 3:
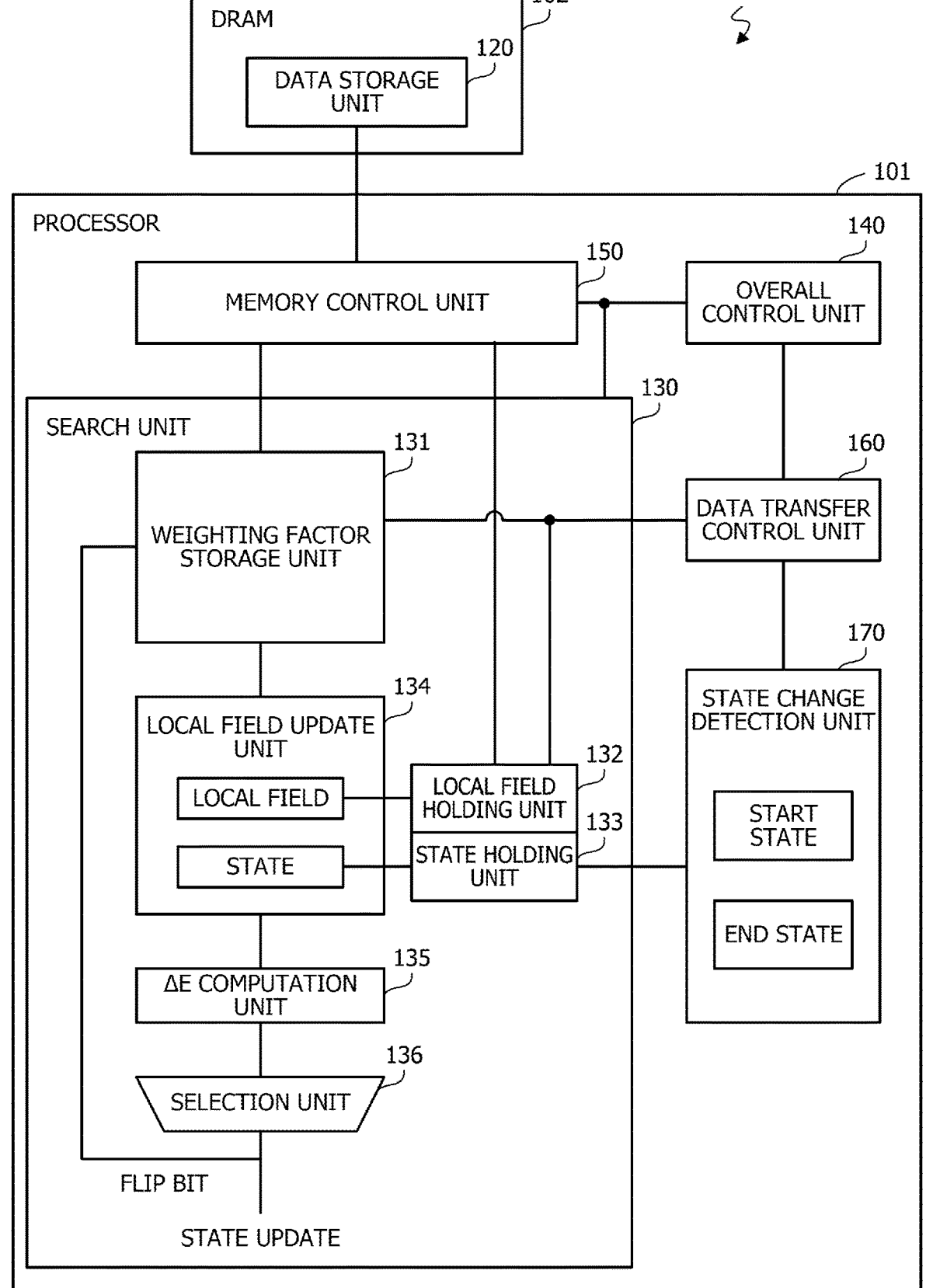
FIG. 3 is a diagram illustrating a functional example of the Ising machine.

FIG. 3 is a diagram illustrating a functional example of the Ising machine.

The Ising machine 100 includes a data storage unit 120, a search unit 130, an overall control unit 140, a memory control unit 150, a data transfer control unit 160, and a state change detection unit 170. A storage area of the DRAM 102 is used for the data storage unit 120.

When the processor 101 is implemented by an ASIC, an FPGA, or the like, the search unit 130, the overall control unit 140, the memory control unit 150, the data transfer control unit 160, and the state change detection unit 170 are implemented by electronic circuits such as an ASIC or an FPGA. When the processor 101 is implemented by a GPU, a CPU, or the like, these functions may be implemented by, for example, the CPU, the GPU, or the like executing a program stored in the DRAM 102.

The data storage unit 120 stores the whole weighting factors used for finding a solution to the combinatorial optimization problem. The data storage unit 120 stores local field information indicating the local fields of all state variables included in the energy function. The data storage unit 120 stores, for each group of state variables, state information after the previous search based on each group. The state information indicates the values of the N state variables. The data storage unit 120 stores, for each of the N state variables, bit change information indicating the presence or absence of a change in the value, that is, a bit change, by the latest search. For example, the bit change information is represented by N-bit information corresponding to the indices of the state variables, where 1 represents a change and 0 represents no change.

The search unit 130 executes a search for a solution to the combinatorial optimization problem, using the SA method or the replica exchange method. The search unit 130 searches for a solution by switching to each of a plurality of groups of state variables that are objects intended to be searched. The search unit 130 includes a weighting factor storage unit 131, a local field holding unit 132, a state holding unit 133, a local field update unit 134, a ΔE computation unit 135, and a selection unit 136. Storage areas of the internal memory 110 are used for the weighting factor storage unit 131, the local field holding unit 132, and the state holding unit 133.

The weighting factor storage unit 131 stores some weighting factors of the whole weighting factors stored in the data storage unit 120. The weighting factors stored in the weighting factor storage unit 131 are weighting factors used to update the local field of each state variable belonging to the current group.

The local field holding unit 132 holds the local field of each state variable belonging to the current group, which has been read from the data storage unit 120.

The state holding unit 133 holds the state information read from the data storage unit 120. The state information held in the state holding unit 133 is updated to the latest state according to the local field update of each state variable by the local field update unit 134.

The local field update unit 134 updates the local field of each state variable belonging to the group intended to be searched, by formula (6), based on the weighting factors stored in the weighting factor storage unit 131. The update of the local fields by the local field update unit 134 is executed immediately before a search on the group that is a next object intended to be searched is performed and during the search. The local field update unit 134 can execute the update of the local field of each state variable in parallel.

In the update of the local fields immediately before the search on the next group is performed, the local field update unit 134 reflects the influence of a state variable whose value has changed from the value after the previous search, among the state variables corresponding to another group, in the local fields of the state variables belonging to the next group. "After the previous search" indicates after the previous search on the next group. The state variable of another group whose value has changed is specified by the bit change information acquired from the data storage unit 120. In addition, the direction of change in the value of the state variable of another group whose value has changed, that is, whether the change is from 0 to 1 or the change is from 1 to 0 is specified by the state information and the bit change information after the previous search stored in the state holding unit 133.

In the update of the local fields during the search for a solution on the group intended to be searched, the local field update unit 134 updates the local field of each state variable belonging to the group according to the change in the value of the state variable belonging to the group.

When the search is started, the ΔE computation unit 135 computes the energy change ΔE according to the change in the value of each state variable in parallel based on formula (3) and outputs the computed energy change ΔE to the selection unit 136.

The selection unit 136 selects a state variable whose value is permitted to change, based on the energy change ΔE of each state variable acquired from the ΔE computation unit 135 and formula (7). When there is a plurality of state variables whose values are permitted to change, the selection unit 136 randomly selects one of the state variables, for example, using a random number or the like. The state variable selected by the selection unit 136 is referred to as a flip bit.

The selection unit 136 outputs information on the flip bit to the weighting factor storage unit 131 and causes the weighting factor storage unit 131 to output the weighting factors corresponding to the flip bit to the local field update unit 134. This ensures that the local field of each state variable is updated by the local field update unit 134. In addition, the selection unit 136 updates the state with the information on the flip bit. For example, the selection unit 136 updates the state held in the state holding unit 133 to the latest state.

The overall control unit 140 controls the search unit 130, the memory control unit 150, and the data transfer control unit 160. For example, the overall control unit 140 controls data transfer between the data storage unit 120 and the search unit 130 due to switching between the subproblems, that is, switching between the groups of state variables intended to be searched, and the search for a solution by the search unit 130.

The memory control unit 150 controls the transfer of the weighting factors from the data storage unit 120 to the weighting factor storage unit 131 under the control of the overall control unit 140. In addition, the memory control unit 150 controls the transfer of the local fields between the data storage unit 120 and the local field holding unit 132 and the transfer of the state information between the data storage unit 120 and the state holding unit 133 under the control of the overall control unit 140.

The data transfer control unit 160 acquires the bit change information from the data storage unit 120 via the overall control unit 140 and the memory control unit 150 and specifies the weighting factor to be read from the data storage unit 120, based on the bit change information. The data transfer control unit 160 instructs the memory control unit 150 on the weighting factors intended to be read, via the overall control unit 140, to cause the memory control unit 150 to read the weighting factors intended to be read, into the weighting factor storage unit 131.

The data transfer control unit 160 detects, for the next group intended to be searched, a state variable whose value has changed after the previous search on the next group. Then, the data transfer control unit 160 controls such that only the weighting factors corresponding to the detected state variable are read from the data storage unit 120 of the DRAM 102 as the weighting factors used for the local field update. This may enable to lessen the data transfer amount for the weighting factors between the DRAM 102 and the processor 101. For example, when the state variables whose values have changed account for 10%, it is sufficient for the data transfer control unit 160 to read only the weighting factor data equal to 10% from the DRAM 102.

Since the weighting factors read in this way are only used for the local field update before the search on the next group, the weighting factors may be erased from the internal memory 110 once the local field update ends. Note that the weighting factors used for the local field update are not allowed in some cases to be arranged in the weighting factor storage unit 131 of the internal memory 110 at a time. In that case, processing is repeated in such a manner that the processing of the local field update is performed after the amount that can be arranged at a time is stored, and after the local field update ends, the remaining weighting factors are overwritten on the weighting factor storage unit 131 to perform the continuation of the local field update.

Thereafter, the data transfer control unit 160 instructs the memory control unit 150 via the overall control unit 140 to read the local fields, the state information, and the weighting factors used for the next search. Regarding the weighting factors for use in the next search, the whole weighting factors desired for the search are read into the weighting factor storage unit 131.

In addition, after the search in the current group is ended, the data transfer control unit 160 instructs the memory control unit 150 to transfer information on the local fields corresponding to the current group after the search to the data storage unit 120 from the local field holding unit 132. Similarly, the data transfer control unit 160 instructs the memory control unit 150 to transfer the state information after the search to the data storage unit 120 from the state holding unit 133.

Furthermore, after the search in the current group ends, the data transfer control unit 160 acquires information on the presence or absence of a change in the value of each state variable by the current search, from the state change detection unit 170, and updates the bit change information held in the data storage unit 120, based on the acquired information. The bit change information is updated by the data transfer control unit 160 via the memory control unit 150.

The state change detection unit 170 compares the state (start state) at the time of starting the search related to the current group with the state (end state) at the time of ending the search related to the current group and specifies the presence or absence of a change in the value of each state variable by the current search. The state change detection unit 170 notifies the data transfer control unit 160 of information indicating the presence or absence of a change in the value of each state variable.

Figure 4:
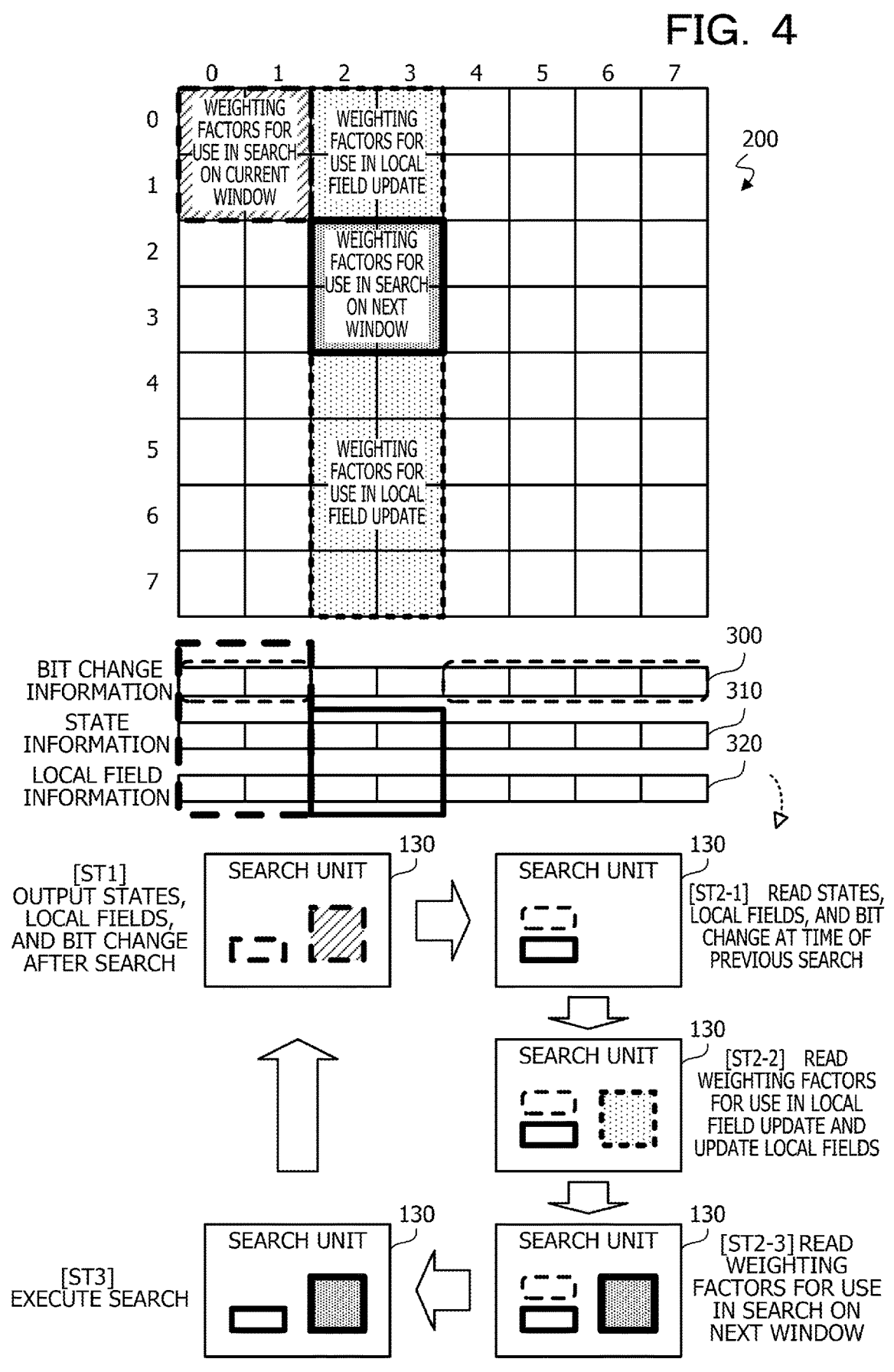

FIG. 4 is a diagram illustrating an example of a search by the Ising machine.

A weighting factor matrix 200 contains the whole weighting factors corresponding to the combinatorial optimization problem. The weighting factor matrix 200 is stored in the data storage unit 120 on the DRAM 102. In the example in FIG. 4, the whole state variables are divided into eight regions. The numbers attached in the row direction and the column direction of the weighting factor matrix 200 indicate region numbers that identify the regions of the state variables. Each region includes the same number of state variables. The state variables are partitioned into region numbers #0 to #7 in the index order.

The number of groups of state variables is four. One group is formed by two regions. In the example in FIG. 4, there is no duplication (overlap) in the state variables included in each group, and the total number of groups is four. The group intended to be searched is referred to as a window. Note that the region mentioned here refers to a subgroup of state variables that can be the minimum granularity for window switching. When one group is referred to as a partial region, one subgroup in the minimum granularity for window switching can be referred to as a unit region. Hereinafter, the unit region is simply referred to as a "region".

For example, the first window has a combination of the regions #0 and #1. The second window has a combination of the regions #2 and #3. The third window has a combination of the regions #4 and #5. The fourth window has a combination of the regions #6 and #7. Note that, as will be described later, some regions included in two windows may have duplication. That is, the windows may be formed such that some state variables belonging to a certain window also belong to another window.

The weighting factor groups included in the weighting factor matrix 200 are distinguished using the region numbers #0 to #7. For example, the weighting factor group corresponding to the pair of the state variables in the region #0 and the state variables in the region #1 is expressed as W_01. Note that W_pq=W_qp is met regarding the row p and the column q related to the region numbers.

Here, the number of state variables included in one region is assumed to be k. Then, the number of state variables included in one window is K=2k. The numerical values after the underscore "_" of the reference sign of the weighting factor indicate the following index ranges relating to the state variables. "0" denotes 1 to k. "1" denotes k+1 to 2k. "2" denotes 2k+1 to 3k. "3" denotes 3k+1 to 4k. "4" denotes 4k+1 to 5k. "5" denotes 5k+1 to 6k. "6" denotes 6k+1 to 7k. "7" denotes 7k+1 to 8k. For example, W_00 denotes the portion $\{W_{ij}\}$ ($1 \leq i \leq k$, $1 \leq j \leq k$) of the whole weighting factors W.

In one example, in switching between the windows, the window is slid in the forward direction of the index. That is, forward sliding without window overlap is performed. After searching the last window, the forward sliding returns to the first window.

In the example in FIG. 4, a case where the current window to be searched has the regions #0 and #1 is exemplified. In this case, the weighting factors for use in the search on the current window to be read into the internal memory 110 are W_00, W_10, W_01, and W_11. In addition, the next window has the regions #2 and #3.

The weighting factors for use in the search on the next window are W_22, W_32, W_23, and W_33. In addition, the weighting factors for use in the local field update corresponding to the next window are weighting factors corresponding to a state variable changed from the time of the previous search, among W_02, W_12, W_42, W_52, W_62, W_72, W_03, W_13, W_43, W_53, W_63, and W_73.

The bit change information 300, the state information 310, and the local field information 320 are held in the data storage unit 120. Here, the state information 310 is held in the data storage unit 120, for example, for each group of state variables intended to be searched or for each region. The search unit 130 reads the local fields of the state variables belonging to the current group from the local field information 320. The bit change information 300, the state information 310, and the local field information 320 are read into the internal memory 110 from the DRAM 102 as follows in response to switching between the subproblems.

First, when the search on the current window (regions #0 and #1) by the search unit 130 is completed, the memory control unit 150 outputs the states, the local fields, and the bit change after the search to the data storage unit 120. Then, the bit change information 300, the state information and the local field information 320 corresponding to the current window, which are held in the data storage unit 120, are updated (step ST1). Hereinafter, data is read into the search unit 130 via the memory control unit 150.

Before searching the next window (regions #2 and #3), the search unit 130 reads the states, the local fields, and the bit change at the time of the previous search on the next window from the data storage unit 120 (step ST2-1). The states at the time of the previous search on the next window correspond to the state information 310 saved for the next window immediately after the previous search. The bit change information 300 read from the data storage unit 120 is used to specify a weighting factor intended to be read by the data transfer control unit 160.

The search unit 130 reads the weighting factors for use in the local field update of the next window into the weighting factor storage unit 131 and updates the local fields of the state variables belonging to the next window, based on formula (6) (step ST2-2). At this time, it is sufficient for the search unit 130 to read the weighting factors corresponding to a state variable whose value has changed from the value after the previous search on the next window, as the weighting factors for use in the local field update, based on the bit change information 300 and the state information 310, and to update the local fields. The weighting factors for use in the local field update to be read in step ST2-2 are weighting factors corresponding to a state variable whose value has changed from the time of the previous search, among W_02, W_12, W_42, W_52, W_62, W_72, W_03, W_13, W_43, W_53, W_63, and W_73.

The search unit 130 reads the weighting factors for use in the search on the next window (step ST2-3). The weighting factors for use in the search on the next window are W_22, W_32, W_23, and W_33. The weighting factors for use in the local field update held in the weighting factor storage unit 131 are overwritten.

The search unit 130 executes a search using the weighting factors for use in the search on the next window stored in the weighting factor storage unit 131 (step ST3). Then, after the search ends, the search returns to step ST1 and further proceeds to processing of the following window.

Figure 5:
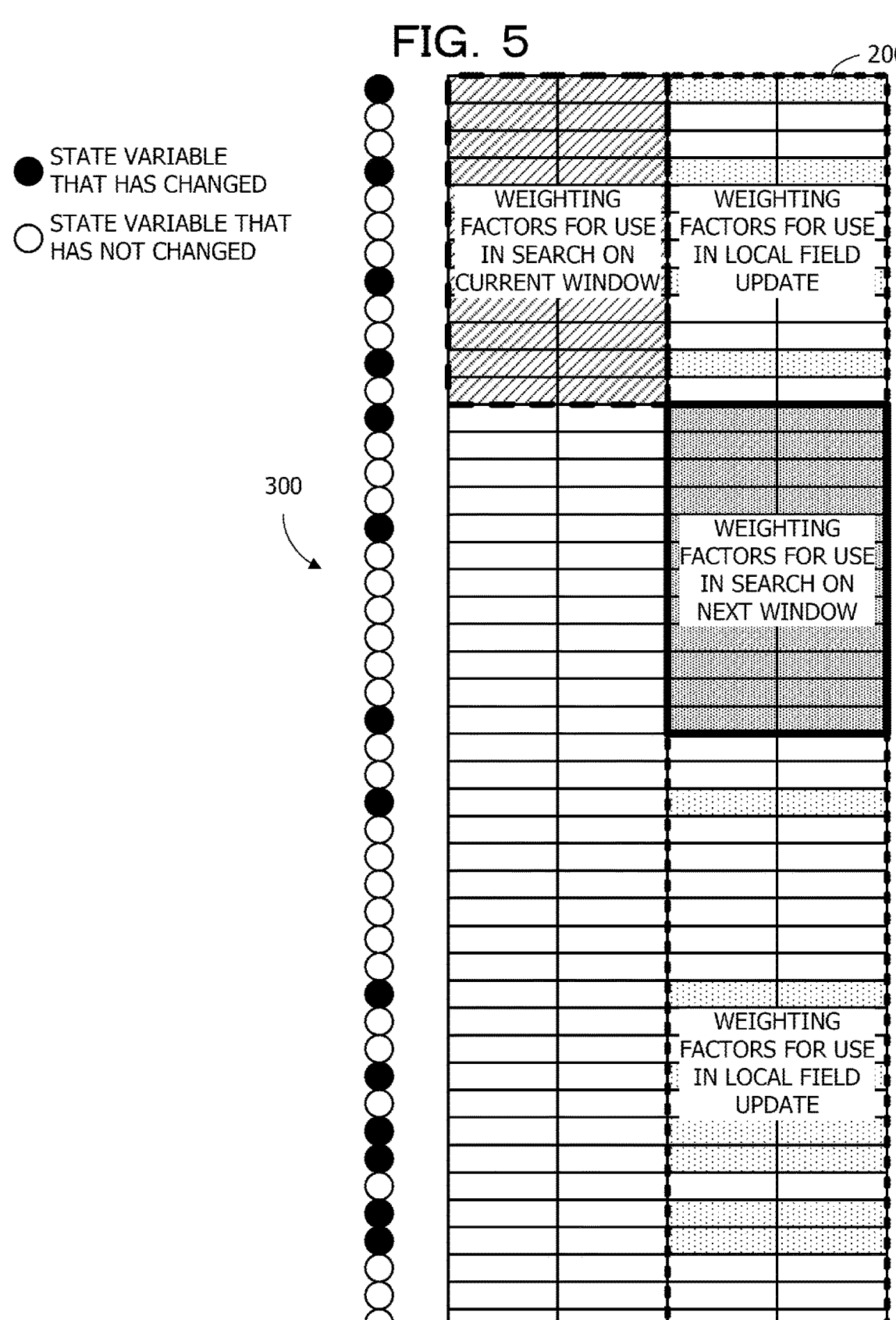
FIG. 5 is a diagram illustrating a first example of weighting factors intended to be read.

FIG. 5 is a diagram illustrating a first example of the weighting factors intended to be read.

Based on the bit change information 300, the data transfer control unit 160 can specify a state variable whose value has changed from the value after the previous search on the next window. In the example in FIG. 5, state variables whose values have changed in the bit change information 300 are indicated by the black circles, and state variables whose values have not changed are indicated by the white circles. Based on the bit change information 300, the data transfer control unit 160 handles only the row corresponding to a state variable that has changed from the state variable after the previous search on the next window, as the weighting factors for use in the local field update in tended to be read, among the weighting factor group related to the state variables of the next window in the weighting factor matrix 200.

Figure 6:
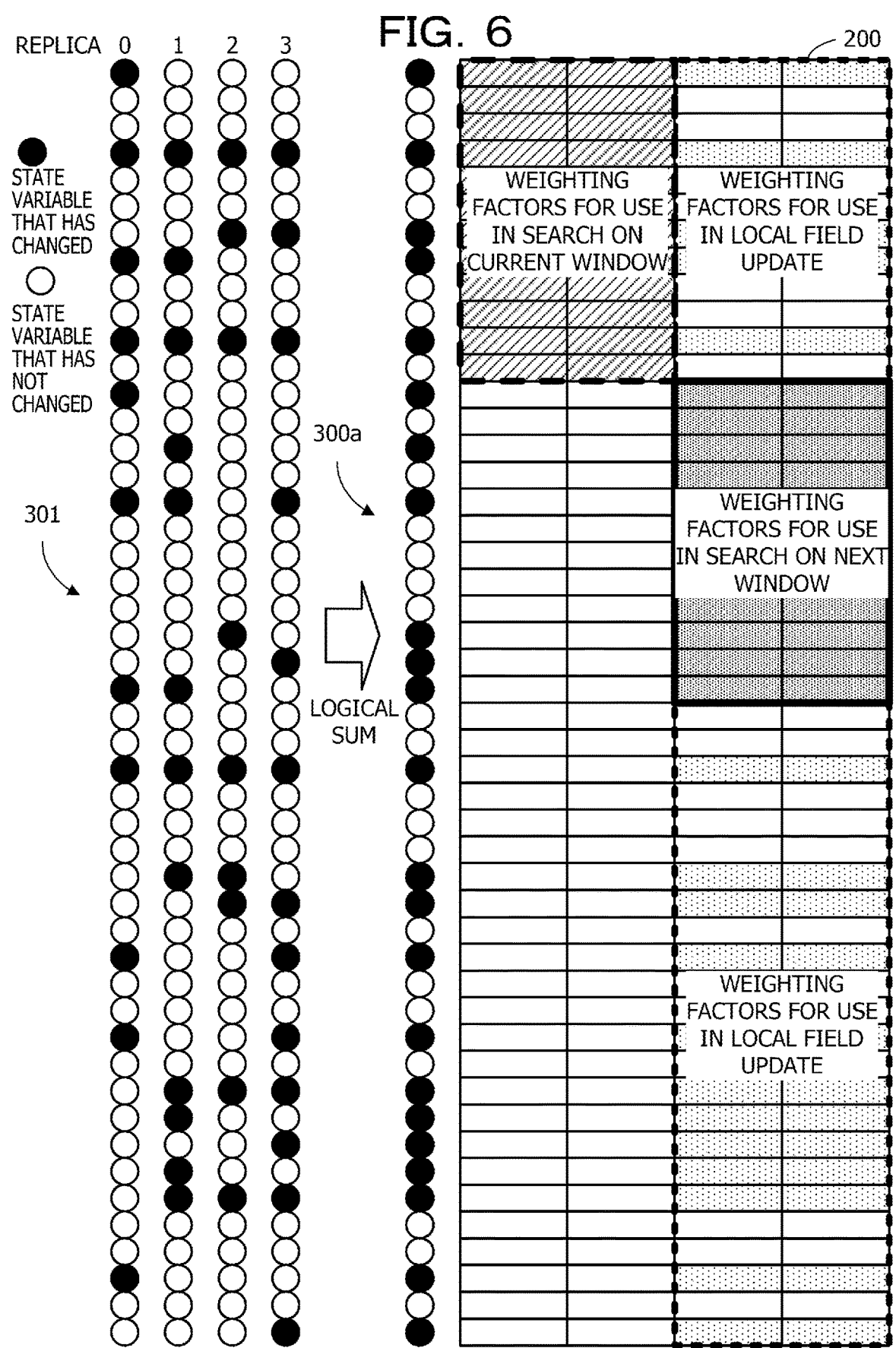
FIG. 6 is a diagram illustrating a second example of weighting factors intended to be read.

FIG. 6 is a diagram illustrating a second example of the weighting factors intended to be read.

FIG. 6 exemplifies a case where a plurality of replicas is used. The replica is replication of the whole states. Each of the plurality of replicas has N state variables and represents the states. The search unit 130 can also execute to find a plurality of solutions by the SA method in parallel on the plurality of replicas or can also execute the replica exchange method on the plurality of replicas, by pipeline processing using the weighting factors held in the weighting factor storage unit 131. The windows processed in parallel in each replica are the same window.

In this case, the data storage unit 120 holds the bit change information 301 for each replica and also holds bit change information 300a that has a bitwise logical sum (OR operation) of the bit change information 301 for each replica. For example, when four replicas #0 to #3 are used, four pieces of the bit change information 301 each for one replica are held in total. The bit change information 300a will have a bitwise logical sum of the four pieces of the bit change information 301.

Based on the bit change information 300a, the data transfer control unit 160 can specify a state variable whose value has changed from the value after the previous search on the next window over all the replicas. Based on the bit change information 300a, the data transfer control unit 160 handles only the row corresponding to a state variable that has changed from the state variable after the previous search on the next window, as the weighting factors for use in the local field update intended to be read, among the weighting factor group related to the state variables of the next window in the weighting factor matrix 200. In this case, for each replica, the search unit 130 updates the local field according to the direction of change in the value of the state variable that has changed, based on the bit change information 301 on the replica and the state information after the previous search related to the window of the replica intended to be searched.

Next, processing procedures executed by the Ising machine 100 will be described. Hereinafter, a case where the replica exchange method is used will be exemplified.

Figure 7:
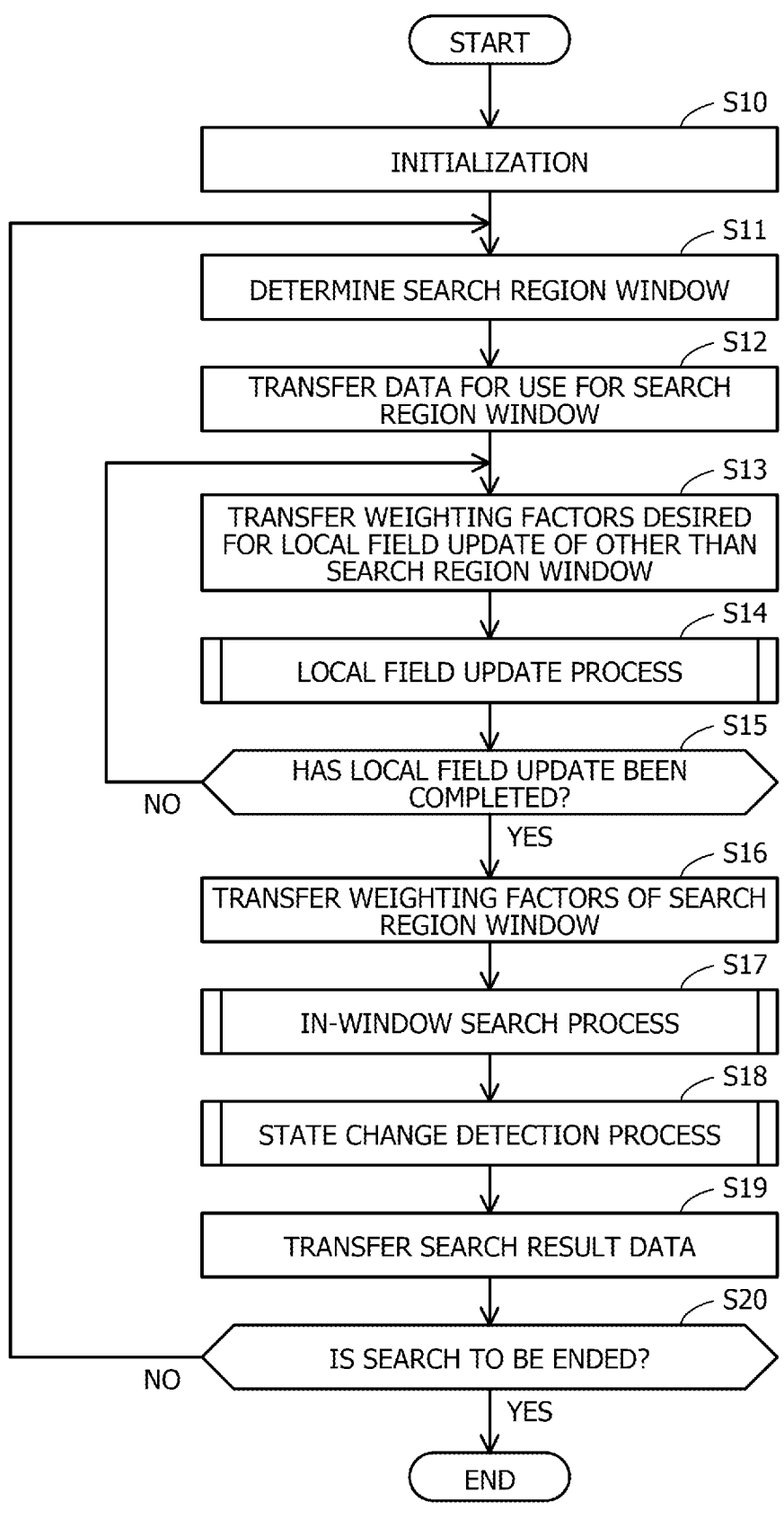
FIG. 7 is a flowchart illustrating an example of a search process of the Ising machine.

FIG. 7 is a flowchart illustrating an example of a search process of the Ising machine.

(S10) The overall control unit 140 initializes the search unit 130.

(S11) The overall control unit 140 determines a next search region window.

(S12) The data transfer control unit 160 uses the memory control unit 150 to transfer data for use for the search region window. The data transferred to the internal memory 110 from the DRAM 102 includes the state information 310 for each replica indicating the value of each state variable after the end of the previous search on the next search region window. In addition, the data includes the local fields of the state variables belonging to the search region window and the bit change information 300a and 301. In the example in FIG. 6, the bit change information 301 has bit change information on each of the four replicas. For example, the bit change information 300a and 301 is held in a register or the like of the data transfer control unit 160.

(S13) Based on the bit change information 300a, the data transfer control unit 160 uses the memory control unit 150 to transfer the weighting factors desired for the local field update of other than the search region window, that is, the weighting factors for use in the local field update, to the internal memory 110 from the DRAM 102.

(S14) The search unit 130 performs a local field update process. Details of the local field update process will be described later.

(S15) The search unit 130 verifies whether or not the local field update has been completed. When the local field update has been completed, the process proceeds to step S16. When the local field update has not been completed, the process proceeds to step S13. Here, the weighting factors for use in the local field update may be read into the internal memory 110 a plurality of times for local field update by the search unit 130. This is because the overall size of the weighting factors for use in the local field update is sometimes larger than the storage capacity available in the weighting factor storage unit 131 of the internal memory 110.

(S16) The data transfer control unit 160 uses the memory control unit 150 to transfer the weighting factors of the search region window, that is, the weighting factors for use in the search on the next window, to the internal memory 110 from the DRAM 102.

(S17) The search unit 130 performs an in-window search process. Details of the in-window search process will be described later.

(S18) The state change detection unit 170 performs a state change detection process. Details of the state change detection process will be described later.

(S19) The data transfer control unit 160 uses the memory control unit 150 to transfer search result data by the search unit 130 to the DRAM 102. This saves the search result data in the data storage unit 120. The search result data includes the latest states, the local fields, and the bit change information 300a and 301 in which the current search result is reflected.

(S20) The overall control unit 140 verifies whether or not to end the search. When the search is to be ended, the search process ends. When the search is not to be ended, the process proceeds to step S11. For example, when steps S11 to S19 have been executed a predetermined number of times or for predetermined time, the overall control unit 140 verifies that the search is to be ended. For example, after ending the search, the overall control unit 140 outputs a solution having the smallest energy among the solutions obtained until then.

Figure 8:
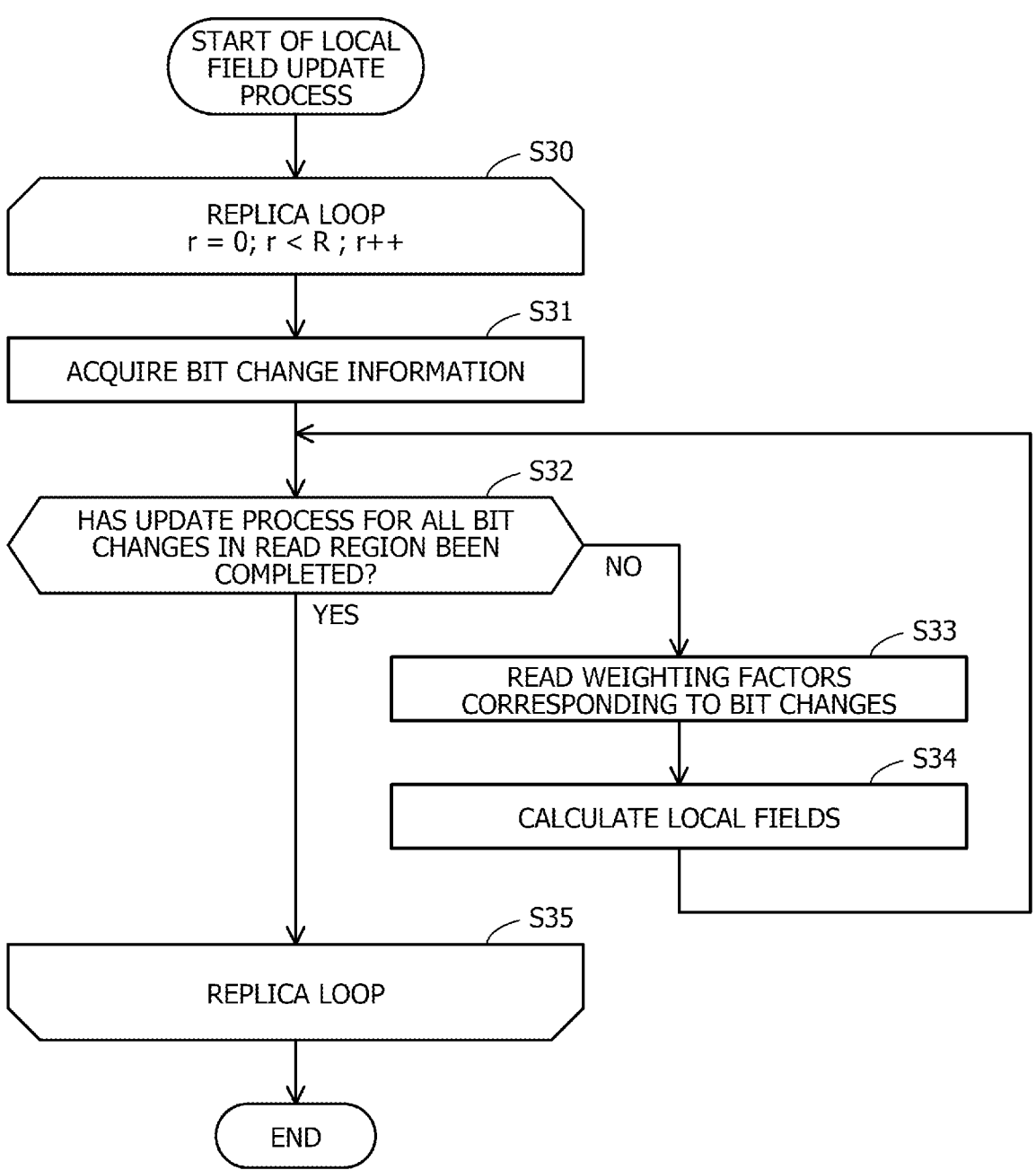
FIG. 8 is a flowchart illustrating an example of a local field update process.

FIG. 8 is a flowchart illustrating an example of the local field update process.

The local field update process corresponds to step S14.

(S30) The search unit 130 executes steps S31 to S34 for each replica. The number of replicas is R. Note that, as will be described later, the search unit 130 can execute steps S31 to S34 on each replica in a pipeline.

(S31) The search unit 130 acquires the bit change information 301 on the relevant replica from the data transfer control unit 160.

(S32) The search unit 130 verifies whether or not the update process for the local fields for all bit changes in the read region has been completed. When the update process has been completed, the process proceeds to step S35. When the update process has not been completed, the process proceeds to step S33.

(S33) The search unit 130 reads the weighting factors corresponding to the bit changes from the weighting factor storage unit 131, based on the bit change information 301 on the relevant replica. For example, the search unit 130 reads one weighting factor corresponding to a bit change in the index order.

(S34) The search unit 130 performs local field update calculation based on formula (6). The search unit 130 executes the local field update calculation in parallel on each state variable in the search region window. Then, the process proceeds to step S32.

(S35) When completing the update of the local fields for all the replicas, the search unit 130 ends the local field update process.

Figure 9:
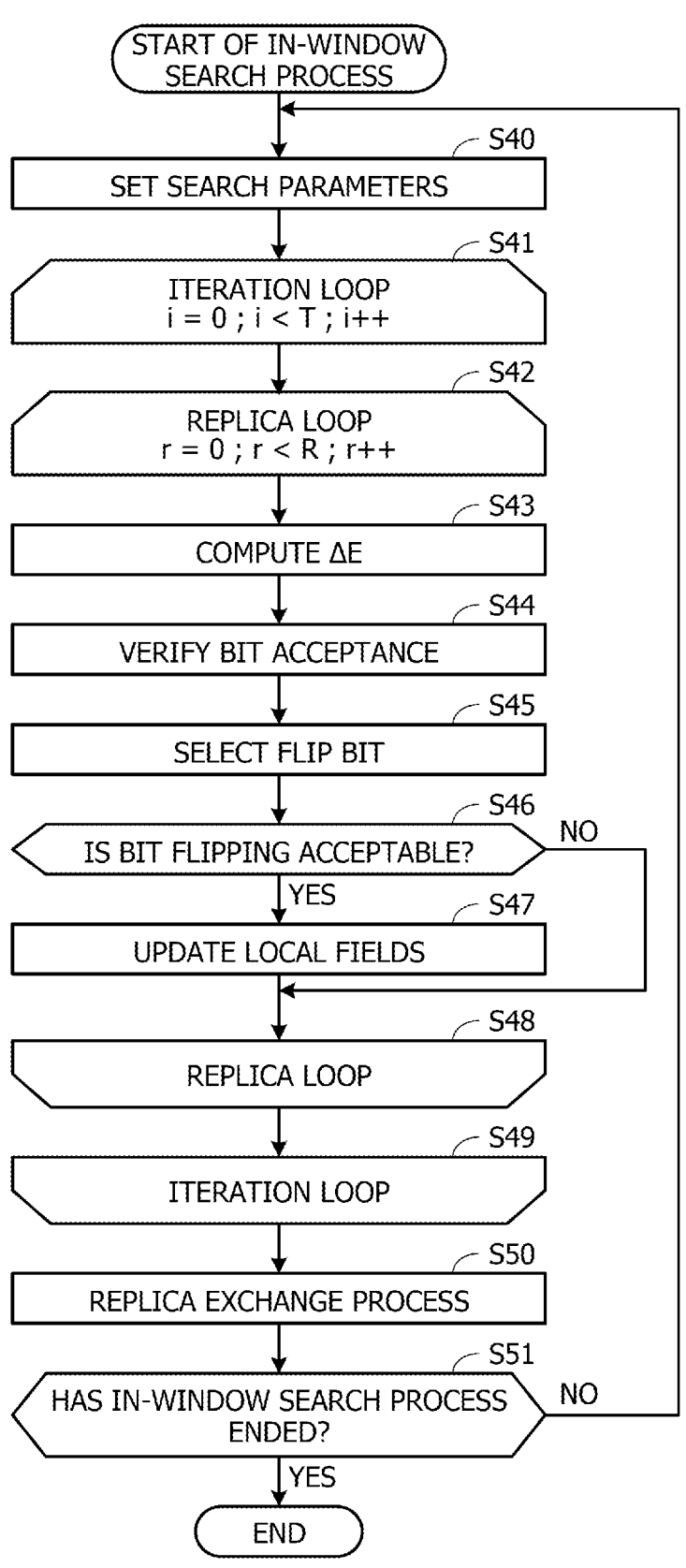
FIG. 9 is a flowchart illustrating an example of an in-window search process.

FIG. 9 is a flowchart illustrating an example of the in-window search process.

The in-window search process corresponds to step S17.

(S40) The overall control unit 140 sets search parameters in the search unit 130. The search parameters include a temperature value, the total iteration count T, and the like used for the search. Note that, when step S40 is executed after the execution of step S50 described later, the temperature value has already been set, and thus the temperature value does not have to be set.

(S41) The search unit 130 repeatedly executes steps S42 to S48 for an iteration count i. Here, an initial value of i is zero. Until falling to the total iteration count T, i is incremented by one at a time.

(S42) The search unit 130 executes steps S43 to S47 for each replica. The number of replicas is R. The search unit 130 can execute steps S43 to S47 on each replica in a pipeline.

(S43) The search unit 130 computes ΔE relating to each state variable, based on formula (3). The calculation of ΔE is executed on each state variable in parallel.

(S44) The search unit 130 performs bit acceptance verification, based on formula (7).

(S45) The search unit 130 selects a flip bit based on the result of the bit acceptance verification. When the result of the bit acceptance verification includes a plurality of state variables that are permitted to change, the search unit 130 selects one of the state variables, for example, using a random number.

(S46) The search unit 130 verifies whether or not bit flipping is acceptable. When the flip bit in which the bit flipping is acceptable has been selected in step S45, the process proceeds to step S47. When bit flipping is not acceptable, the process proceeds to step S48. For example, when there is no state variable that is permitted to change in the bit acceptance verification in step S44, bit flipping is not acceptable.

(S47) The search unit 130 performs local field update. That is, the search unit 130 reflects the change in the value of the state variable intended to be flipped, in the state, and also updates the local fields of the state variables in the current window, using the weighting factors for use in the search on the current window held in the weighting factor storage unit 131.

(S48) When the processing of the current iteration is completed for all replicas, the search unit 130 advances the process to step S49.

(S49) When the processing of all iterations is completed, the search unit 130 advances the process to step S50.

(S50) The search unit 130 executes a replica exchange process. This ensures that exchange of temperature values or exchange of states between replicas is performed, for example, based on a predetermined probability.

(S51) The search unit 130 verifies whether or not the in-window search process for the current window has ended. When the in-window search process for the current window has ended, the in-window search process ends. When the in-window search process for the current window has not ended, the process proceeds to step S40. For example, when steps S40 to S50 are executed a predetermined number of times or for predetermined time, the search unit 130 verifies that the in-window search process is to be ended.

Figure 10:
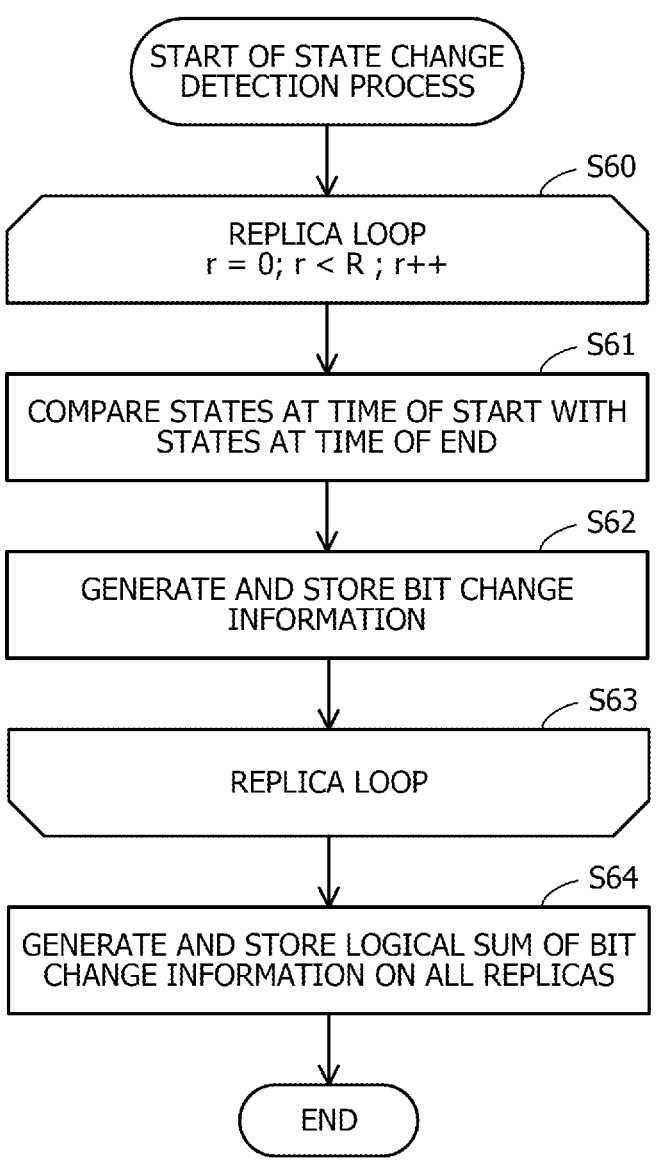
FIG. 10 is a flowchart illustrating an example of a state change detection process.

FIG. 10 is a flowchart illustrating an example of the state change detection process.

The state change detection process corresponds to step S18.

(S60) The state change detection unit 170 executes steps S61 and S62 for each replica. The number of replicas is R.

(S61) The state change detection unit 170 compares the states of the current window of the relevant replica at the time of the start of the search with the states at the time of the end.

(S62) The state change detection unit 170 generates the bit change information 301 relating to the relevant replica according to the result of the comparison in step S61 and stores the generated bit change information 301 in a predetermined storage area or register of the internal memory 110.

(S63) When the state change detection for all replicas is completed, the state change detection unit 170 ends the state change detection process.

(S64) The state change detection unit 170 generates a logical sum of the bit change information 301 on all replicas, that is, the bit change information 300a, and stores the generated bit change information 300a in a predetermined storage area or register of the internal memory 110. Then, the state change detection process ends.

In this manner, the Ising machine 100 performs a search on each group by the replica exchange method, by switching to each of the plurality of groups of state variables as objects intended to be searched. Note that, when the SA method is executed in parallel with a plurality of replicas, processing of lowering the temperature value in each replica is executed in step S50, instead of the replica exchange process. In addition, when the SA method is executed with a single replica, R=1 is simply assumed in the procedures in FIGS. 8 to 10.

Note that, when the SA method is executed, the processor 101 may perform a procedure of lowering the temperature value and sequentially searching all the search region windows again after the search on all search region windows at a certain temperature value is completed, from the initial temperature value to the final temperature value.

Next, another example of window switching will be described. First, an example in which two windows overlap will be described.

Figure 11:
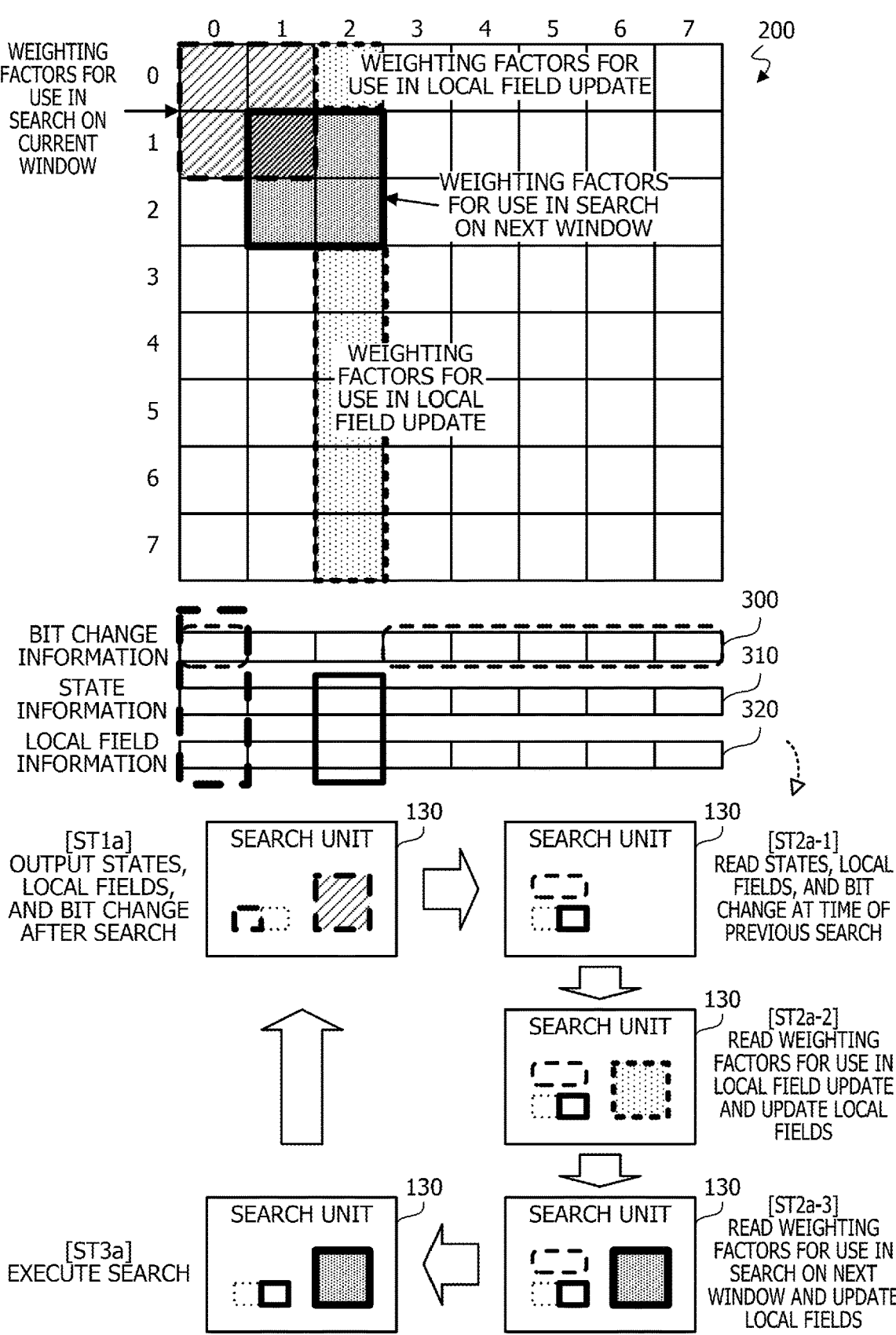
FIG. 11 is a diagram illustrating an example in which two windows overlap.

FIG. 11 is a diagram illustrating an example in which two windows overlap.

When two windows overlap, the memory control unit 150 can omit the output to the data storage unit 120 for the shared region. For example, when the current window has the regions #0 and #1 and the next window has the regions #1 and #2, data is read into the internal memory 110 from the DRAM 102 as follows in response to window switching. Note that, in the example in FIG. 11, it is assumed that the bit change information 300 is used. In addition, in switching between the windows, the window is assumed to be slid in the forward direction of the index. That is, forward sliding with window overlap is performed. After searching the last window, the forward sliding returns to the first window. In addition, the weighting factors for use in the search on the current window are W_00, W_10, W_01, and W_11.

First, when the search on the current window (regions #0 and #1) by the search unit 130 is completed, the memory control unit 150 outputs the states, the local fields, and the bit change after the search to the data storage unit 120. At this time, the memory control unit 150 only has to output the states, the local fields, and the bit change relating to the region #0 and can omit the output of the states, the local fields, and the bit change relating to the region #1. Then, the bit change information 300, the state information and the local field information 320 for each region corresponding to the current window, which are held in the data storage unit 120, are updated (step ST1a).

Before searching the next window (regions #1 and #2), the search unit 130 reads the states, the local fields, and the bit change at the time of the previous search on the next window from the data storage unit 120 (step ST2a-1). At this time, the search unit 130 already holds the latest value of each state variable regarding the region #1 included in the next window. Therefore, the search unit 130 can omit reading of the local fields regarding the region #1.

The search unit 130 reads the weighting factors for use in the local field update relating to the region #2 of the next window into the weighting factor storage unit 131 and updates the local fields of the state variables belonging to the region #2 of the next window, based on formula (6) (step ST2a-2). At this time, it is sufficient for the search unit 130 to read the weighting factors corresponding to a state variable whose value has changed from the value after the previous search on the next window, as the weighting factors for use in the local field update, based on the bit change information 300 and the state information 310, and to update the local fields. In addition, since the local fields of the state variables in the region #1 of the next window are already the latest, the search unit 130 can omit the update of the local fields of the state variables in the region #1. The weighting factors for use in the local field update to be read in step ST2a-2 are weighting factor corresponding to a state variable whose value has changed from the time of the previous search on the region #1, among W_02, W_32, W_42, W_52, W_62, and W_72.

The search unit 130 reads the weighting factors for use in the search on the next window. The weighting factors for use in the search on the next window are W_11, W_21, W_12, and W_22. The weighting factors for use in the local field update held in the weighting factor storage unit 131 are overwritten. Then, the search unit 130 updates the local fields of the state variables in the region #2 according to the change in the value of the state variable in the region #1 by the immediately preceding search, based on the weighting factors for use in the search on the next window (step ST2*a*-3). Note that the direction of change in the value of the state variable in the region #1 by the immediately preceding search is specified based on the bit change in the region #1 detected by the state change detection unit 170 after the immediately preceding search and the state information at the time of the previous search corresponding to the region #2.

The search unit 130 executes a search using the weighting factors for use in the search on the next window stored in the weighting factor storage unit 131 (step ST3*a*). Then, after the search ends, the search returns to step ST1*a* and further proceeds to processing of the following window.

In this manner, when the windows overlap, the search unit 130 updates the local fields using the weighting factors for use in the search on the next window in step ST2*a*-3. The update of the local fields is executed in step S16 of the flowchart in FIG. 7. In addition, the update of the local fields can be performed by a procedure similar to the procedure in the flowchart in FIG. 8.

Next, an example of randomly switching between windows will be described.

Figure 12:
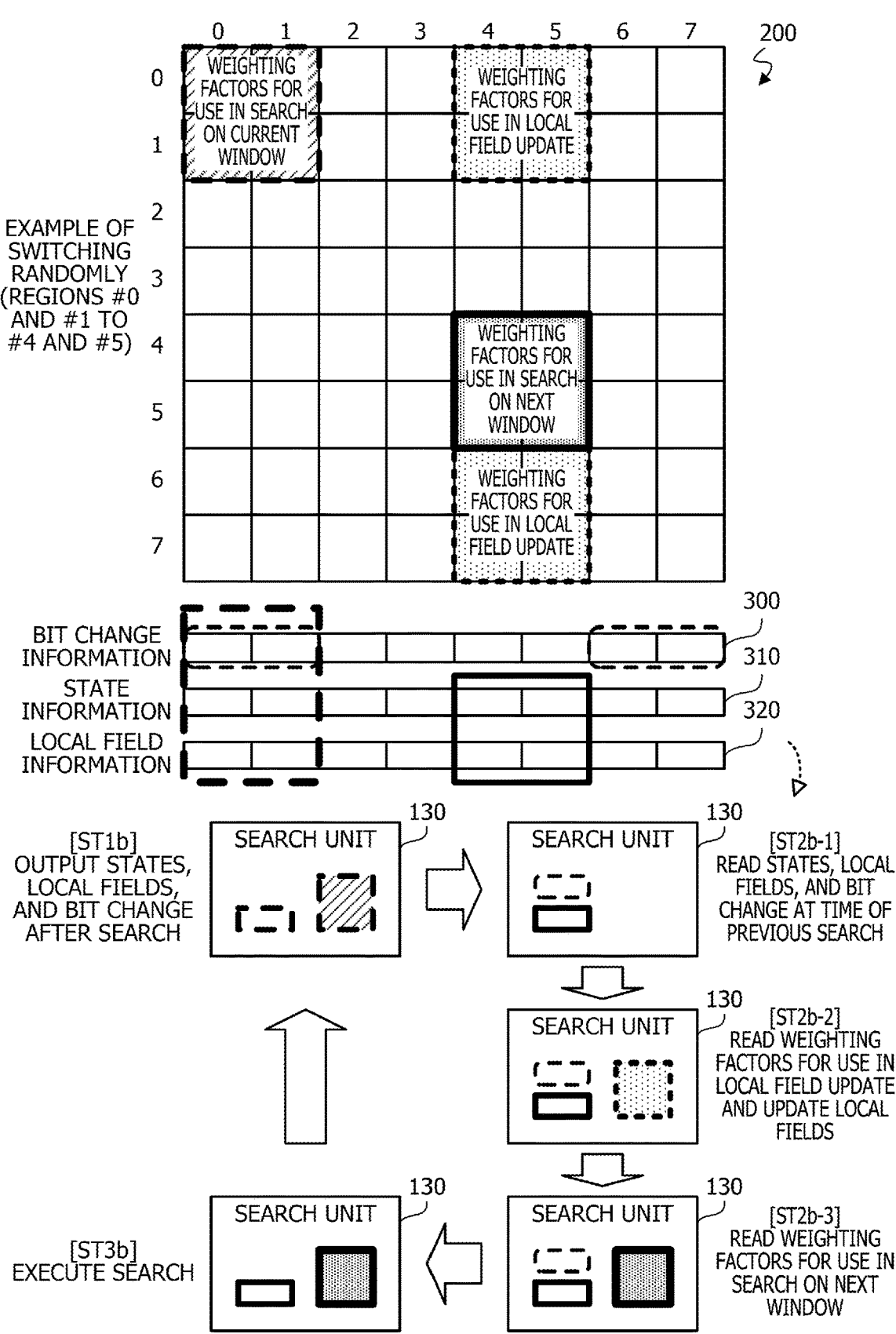
FIG. 12 is a diagram illustrating an example of randomly switching between windows.

FIG. 12 is a diagram illustrating an example of randomly switching between windows.

For example, when the current window has the regions #0 and #1 and the next window randomly selected has the regions #4 and #5, data is read into the internal memory 110 from the DRAM 102 as follows in response to window switching. Note that, in the example in FIG. 12, it is assumed that the bit change information 300 is used. In addition, the weighting factors for use in the search on the current window are W_00, W_10, W_01, and W_11. Furthermore, it is assumed that, before the search on the current window (regions #0 and #1), searches have been performed by sliding the window in the forward direction of the index as in FIG. 4 from the first index to the last index.

First, when the search on the current window by the search unit 130 is completed, the memory control unit 150 outputs the states, the local fields, and the bit change after the search to the data storage unit 120. Then, the bit change information 300, the state information and the local field information 320 for each region corresponding to the current window, which are held in the data storage unit 120, are updated (step ST1*b*).

Before searching the next window (regions #4 and #5), the search unit 130 reads the states, the local fields, and the bit change at the time of the previous search on the next window from the data storage unit 120 (step ST2*b*-1). The states at the time of the previous search on the next window correspond to the state information 310 saved for the next window immediately after the previous search.

The search unit 130 reads the weighting factors for use in the local field update of the next window into the weighting factor storage unit 131 and updates the local fields of the state variables belonging to the next window, based on formula (6) (step ST2*b*-2). At this time, it is sufficient for the search unit 130 to read the weighting factors corresponding to a state variable whose value has changed from the value after the previous search on the regions #4 and #5 of the next window, as the weighting factors for use in the local field update, based on the bit change information 300 and the state information 310, and to update the local fields. In the case of the example in FIG. 12, since the state variables in the regions #2 and #3 have not been altered from the state variables at the time of the previous search on the next window (regions #4 and #5), the reading of the weighting factors related to the state variables in the regions #2 and #3 can be omitted. The weighting factors for use in the local field update to be read in step ST2*b*-2 are weighting factors corresponding to a state variable whose value has changed from the time of the previous search, among W_04, W_14, W_64, W_74, W_05, W_15, W_65, and W_75.

Here, as will be described later, the region including a state variable whose value has changed from the value after the previous search on the regions #4 and #5 of the next window is managed by a predetermined flag (state flag).

The search unit 130 reads the weighting factors for use in the search on the next window (step ST2*b*-3). The weighting factors for use in the search on the next window are W_44, W_54, W_45, and W_55. The weighting factors for use in the local field update held in the weighting factor storage unit 131 are overwritten.

The search unit 130 executes a search using the weighting factors for use in the search on the next window stored in weighting factor storage unit 131 (step ST3*b*). Then, after the search ends, the search returns to step ST1*b* and further proceeds to processing of the following window.

Next, an example in which the regions #4 and #5 are assumed as the current window and the current window is switched to the next window corresponding to the regions #3 and #4 will be described.

Figure 13:
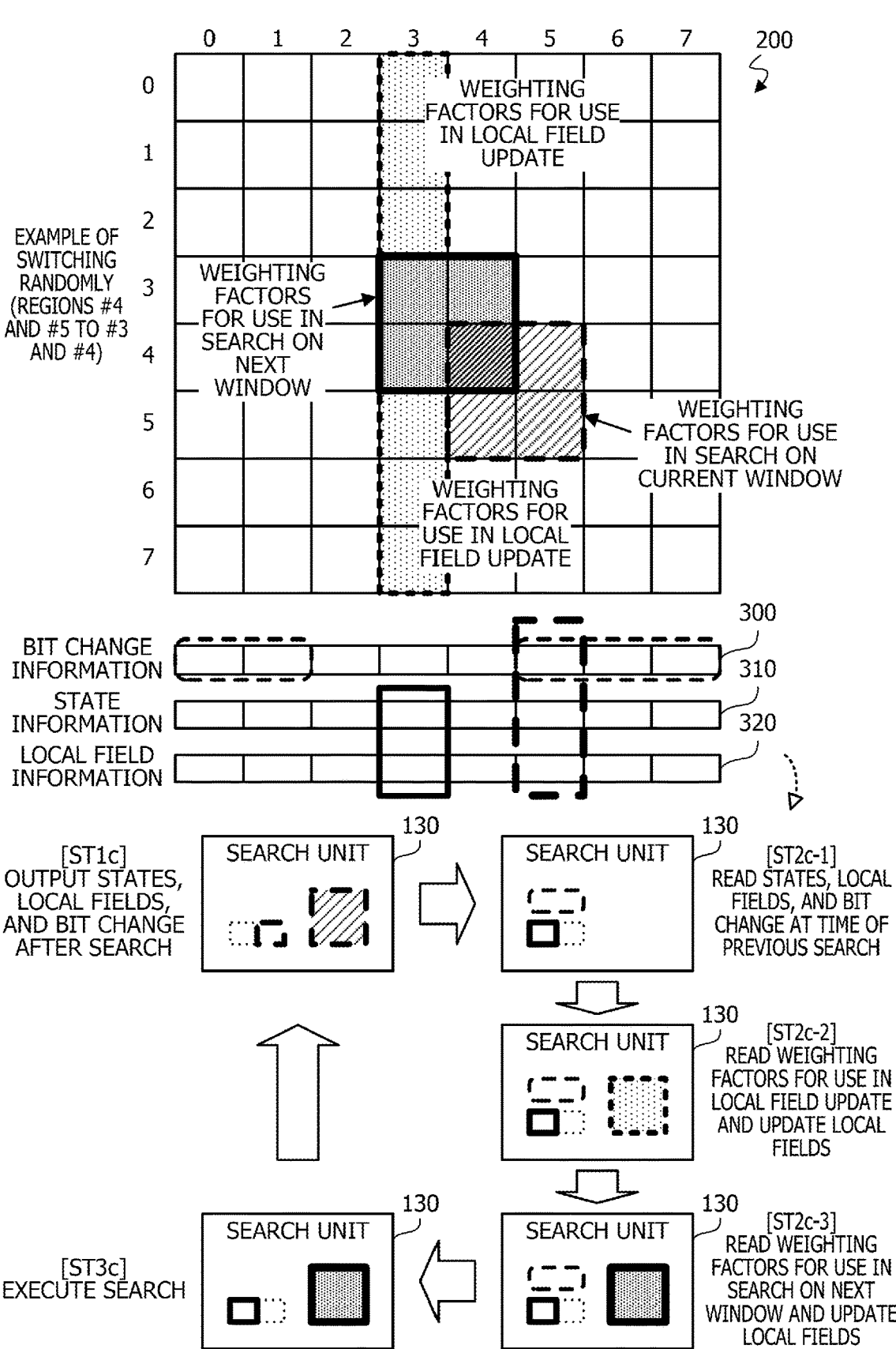
FIG. 13 is a diagram illustrating an example of randomly switching between windows.

FIG. 13 is a diagram illustrating an example of randomly switching between windows.

First, when the search on the current window (regions #4 and #5) by the search unit 130 is completed, the memory control unit 150 outputs the states, the local fields, and the bit change after the search to the data storage unit 120. At this time, the memory control unit 150 only has to output the states, the local fields, and the bit change relating to the region #5 and can omit the output of the states, the local fields, and the bit change relating to the region #4 that duplicates the next window (regions #3 and #4). Then, the bit change information 300, the state information and the local field information 320 for each region corresponding to the current window, which are held in the data storage unit 120, are updated (step ST1*c*).

Before searching the next window (regions #3 and #4), the search unit 130 reads the states, the local fields, and the bit change at the time of the previous search on the next window from the data storage unit 120 (step ST2*c*-1). At this time, the search unit 130 already holds the latest value of each state variable regarding the region #4 included in the next window. Therefore, the search unit 130 can omit reading of the local fields regarding the region #4.

The search unit 130 reads the weighting factors for use in the local field update relating to the region #3 of the next window into the weighting factor storage unit 131 and updates the local fields of the state variables belonging to the region #3 of the next window, based on formula (6) (step ST2*c*-2). At this time, it is sufficient for the search unit 130 to read the weighting factors corresponding to a state variable whose value has changed from the value after the previous search on the region #3 of the next window, as the weighting factors for use in the local field update, based on the bit change information 300 and the state information 310, and to update the local fields. In addition, since the local fields of the state variables in the region #4 of the next window are already the latest, the search unit 130 can omit the update of the local fields of the state variables in the region #4. The weighting factors for use in the local field update to be read in step ST2c-2 are weighting factors corresponding to a state variable whose value has changed from the time of the previous search, among W_03, W_13, W_23, W_53, W_63, and W_73.

Here, as will be described later, the region including a state variable whose value has changed from the value after the previous search on the region #3 of the next window is specified by a predetermined flag (state flag).

The search unit 130 reads the weighting factors for use in the search on the next window. The weighting factors for use in the search on the next window are W_33, W_43, W_34, and W_44. The weighting factors for use in the local field update held in the weighting factor storage unit 131 are overwritten. Then, the search unit 130 updates the local fields of the state variables in the region #3 according to the change in the value of the state variable in the region #4 by the immediately preceding search, based on the weighting factors for use in the search on the next window (step ST2c-3). Note that the direction of change in the value of the state variable in the region #4 by the immediately preceding search is specified based on the bit change in the region #4 detected by the state change detection unit 170 after the immediately preceding search and the state information at the time of the previous search corresponding to the region #3.

The search unit 130 executes a search using the weighting factors for use in the search on the next window stored in the weighting factor storage unit 131 (step ST3c). Then, after the search ends, the search returns to step ST1c and further proceeds to processing of the following window.

In this manner, the search unit 130 may randomly switch between the windows, and additionally, the windows before and after the switching may overlap.

Note that, in the processing of random switching in FIGS. 12 and 13, the state flag is used for a certain region to manage another region whose bit has changed from the bit after the previous search on the certain region. Next, the state flag will be described.

Figure 14:
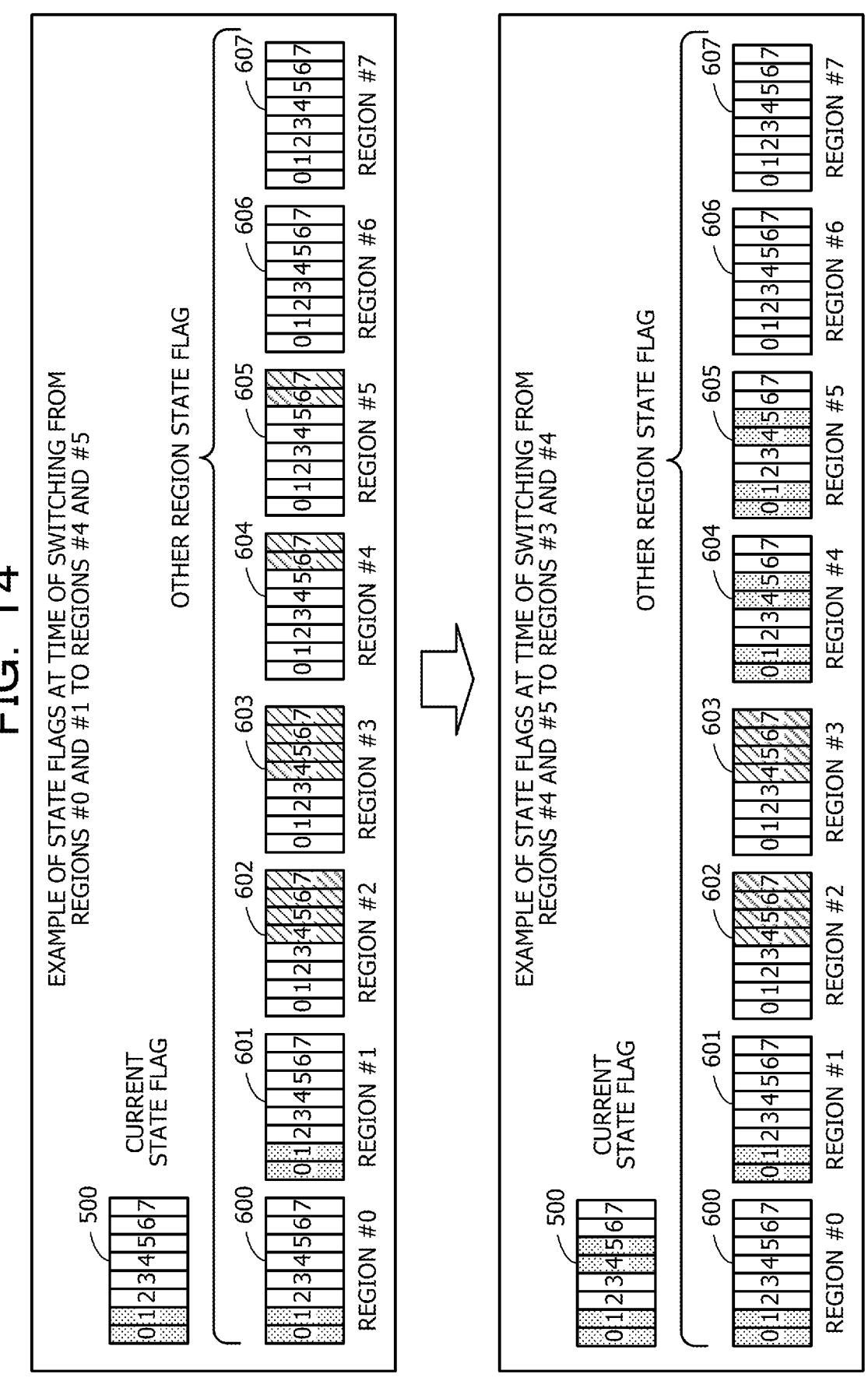
FIG. 14 is a diagram illustrating an example of state flags used for random switching.

FIG. 14 is a diagram illustrating an example of the state flags used for random switching.

The state flags are provided for each region and are held in a predetermined storage area or register of the internal memory 110. The state flag is updated by the state change detection unit 170, for example, and is used to specify a weighting factor intended to be read by the data transfer control unit 160.

The state flags include a current state flag 500 and other region state flags 600, 601, 602, 603, 604, 605, 606, and 607.

The current state flag 500 holds a count value indicating the number of times each region of the regions #0 to #7 has been intended to be searched. The other region state flags 600 to 607 hold a count value indicating the number of times each of the regions #0 to #7 has been intended to be searched at a time point immediately after the previous search on the corresponding region.

The other region state flag 600 corresponds to the region #0. The other region state flag 601 corresponds to the region #1. The other region state flag 602 corresponds to the region #2. The other region state flag 603 corresponds to the region #3. The other region state flag 604 corresponds to the region #4. The other region state flag 605 corresponds to the region #5. The other region state flag 606 corresponds to the region #6. The other region state flag 607 corresponds to the region #7.

The numbers "0" to "7" written in each of the current state flag 500 and the other region state flags 600 to 607 denote the region numbers. In the example of the current state flag 500 and the other region state flags 600 to 607 in FIG. 14, a region corresponding to the diagonally hatched portion has the smallest count value. In addition, the count value of a region corresponding to the white portion has a value obtained by adding one to the count value of the diagonally hatched portion. In addition, the count value of a region corresponding to the dot-hatched portion has a value obtained by adding one to the count value of the white portion.

FIG. 14 illustrates the current state flag 500 and the other region state flags 600 to 607 at the time of switching from the regions #0 and #1 to the regions #4 and #5 exemplified in FIG. 12. In the example in FIG. 12, as described above, it is assumed that, before the search on the current window (regions #0 and #1), searches have been performed by sliding the window in the forward direction of the index as in FIG. 4 from the first index to the last index.

At the time of switching from the regions #0 and #1 to the regions #4 and #5, the other region state flags 600 and 601 of the regions #0 and #1 match the current state flag 500. For example, the count values of the regions #0 and #1 have "2", and the count values of the regions #2 to #7 have "1". Meanwhile, in the other region state flags 604 and 605 of the regions #4 and #5, the count values of the regions #0 to #5 have "1", and the count values of the regions #6 and #7 have "0".

When the regions #4 and #5 are assumed as the next window, the data transfer control unit 160 compares the current state flag 500 with the other region state flags 604 and 605 and specifies a region in which the count value in the current state flag 500 is larger than the count values of the other region state flags 604 and 605. Then, the data transfer control unit 160 controls the memory control unit 150 via the overall control unit 140 to read the weighting factors corresponding to the specified region from the DRAM 102. At the time of the above switching from the regions #0 and #1 to the regions #4 and #5, it is sufficient to read, from among the weighting factors corresponding to the regions #0, #1, #6, and #7, the weighting factors corresponding to a state variable whose value has changed from the value after the previous search on the regions #4 and #5.

Subsequently, FIG. 14 illustrates the current state flag 500 and the other region state flags 600 to 607 at the time of switching from the regions #4 and #5 to the regions #3 and #4 exemplified in FIG. 13.

At the time of switching from the regions #4 and #5 to the regions #3 and #4, the other region state flags 604 and 605 become the same as the current state flag 500 by adding one to the count values of the regions #4 and #5 in the current state flag 500. Specifically, the count values of the regions #0, #1, #4, and #5 have "2", and the count values of the regions #2, #3, #6, and #7 have "1".

Meanwhile, in the other region state flag 603 of the region #3, the count values of the regions #0 to #3 have "1", and the count values of the regions #4 and #7 have "0". At the time of the above switching from the regions #4 and #5 to the regions #3 and #4, the data transfer control unit 160 compares the current state flag 500 and the other region state flag 603. Then, the data transfer control unit 160 handles the weighting factors corresponding to a state variable whose value has changed from the value after the previous search on the region #3, among the weighting factors corresponding to the regions #0, #1, #5, #6, and #7, as objects intended to be read. The weighting factors corresponding to the regions #0, #1, #5, #6, and #7 are used to update the local fields of the state variables in the region #3. Regarding the region #4, since the search unit 130 already holds the latest local fields, the update of the local fields can be omitted. Furthermore, after reading the weighting factors corresponding to the regions #3 and #4 as the weighting factors for use in the search on the next window, the search unit 130 updates the local fields of the state variables in the region #3 according to the bit change in the immediately preceding search on the region #4 and starts the search on the next window (regions #3 and #4).

Next, an example of the update of the local fields in each window switching method described above will be described.

Figure 15:
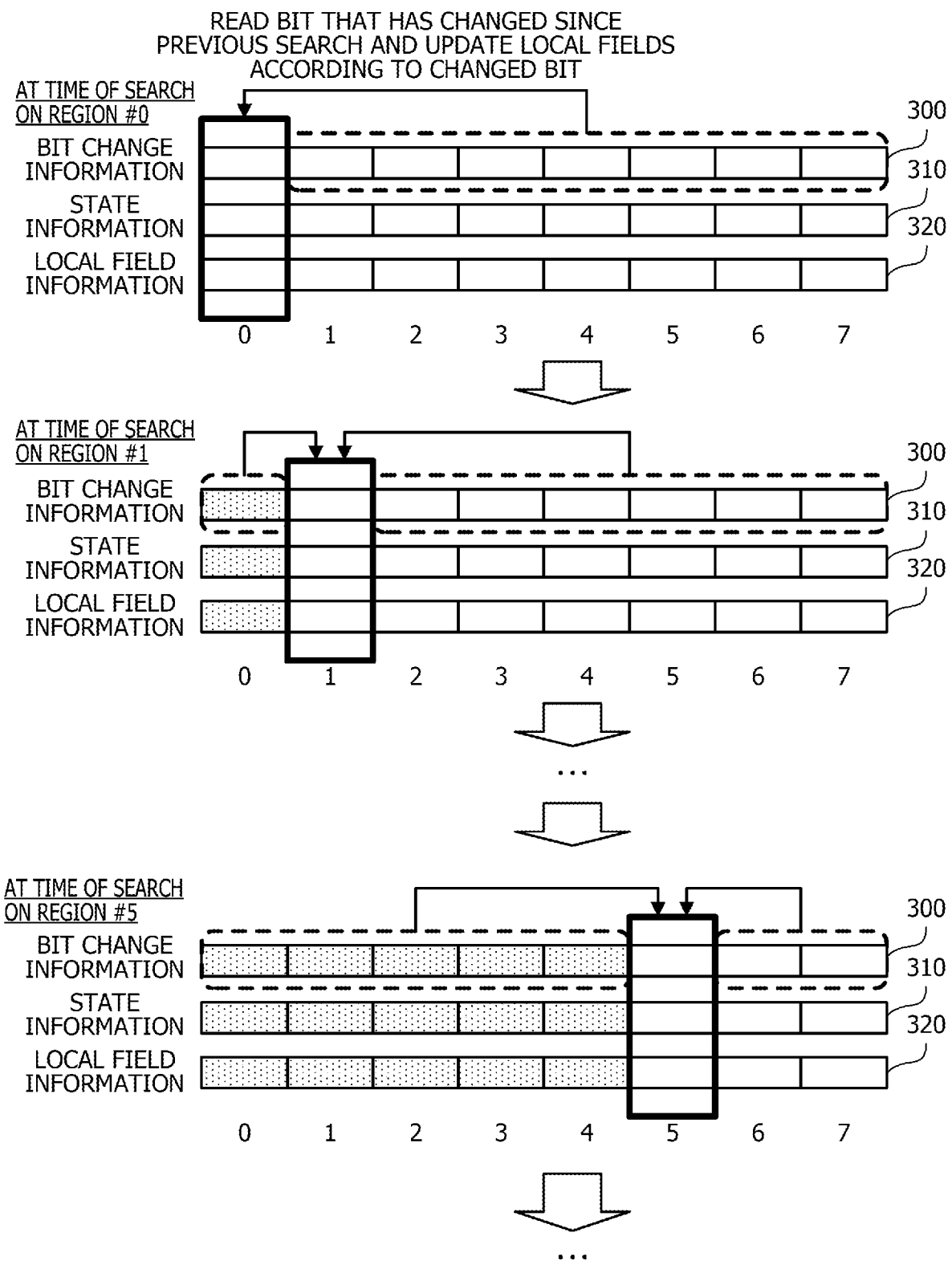
FIG. 15 is a diagram illustrating an example of forward sliding without overlap.

FIG. 15 is a diagram illustrating an example of forward sliding without overlap.

In the example in FIG. 15, one region corresponds to one window. In this case, for example, at the time of searching the region #0, a bit, that is, the weighting factor corresponding to the state variable, that has changed since the previous search on the region #0 among the regions #1 to #7 is read into the internal memory 110, based on the bit change information 300 and the state information 310 corresponding to the region #0. Then, the local fields corresponding to the region #0 are updated according to the changed bit. Thereafter, the weighting factors related to the region #0 are read into the internal memory 110, and the region #0 is searched. Note that only the local fields related to the region #0 are read into the internal memory 110 from the local field information 320 held in the data storage unit 120. Also at the time of subsequent searches on other regions, only the local fields related to the region intended to be searched are read into the internal memory 110.

Next, at the time of searching the region #1, the weighting factors corresponding to a bit that has changed since the previous search on the region #1 among the regions #0 and #2 to #7 are read into the internal memory 110, based on the bit change information 300 and the state information 310 corresponding to the region #1. Then, the local fields corresponding to the region #1 are updated according to the changed bit. Thereafter, the weighting factors related to the region #1 are read into the internal memory 110, and the region #1 is searched.

After that, the window is similarly slid to perform a search. For example, at the time of searching the region #5, the weighting factors corresponding to a bit that has changed since the previous search on the region #5 among the regions #0 to #4, #6, and #7 are read into the internal memory 110, based on the bit change information 300 and the state information 310 corresponding to the region #5. Then, the local fields corresponding to the region #5 are updated according to the changed bit. Thereafter, the weighting factors related to the region #5 are read into the internal memory 110, and the region #5 is searched.

FIG. 16 is a diagram illustrating an example of forward sliding with overlap.

In FIG. 16, two adjacent regions such as regions #0/1 correspond to one window. Here, the expression of the region #0/1 indicates a combination of the regions #0 and #1. The region #7/0 also constitute one window. A certain window and the following window by forward sliding have one duplicated region.

For example, at the time of searching the region #0/1, the weighting factors corresponding to a bit that has changed since the previous search on the region #1 among the regions #2 to #7 are read into the internal memory 110, based on the bit change information 300 and the state information 310 corresponding to the region #1. Then, the local fields corresponding to the region #1 are updated according to the changed bit. Furthermore, after the weighting factors for use in the search on the region #0/1 are read into the internal memory 110, the local fields related to the region #1 are updated according to the bit change in the region #0 in the immediately preceding search. That is, the change amount in the immediately preceding search is reflected in the local fields of the region #1 that is an additional region. Thereafter, the region #0/1 is searched.

Next, at the time of searching the region #1/2, the weighting factors corresponding to a bit that has changed since the previous search on the region #2 among the regions #0 and #3 to #7 are read into the internal memory 110, based on the bit change information 300 and the state information 310 corresponding to the region #2. Then, the local fields corresponding to the region #2 are updated according to the changed bit. Furthermore, after the weighting factors for use in the search on the region #1/2 are read into the internal memory 110, the local fields related to the region #2 are updated according to the bit change in the region #1 in the immediately preceding search. Thereafter, the region #1/2 is searched.

Next, at the time of searching the region #2/3, the weighting factors corresponding to a bit that has changed since the previous search on the region #3 among the regions #0, #1, and #4 to #7 are read into the internal memory 110, based on the bit change information 300 and the state information 310 corresponding to the region #3. Then, the local fields corresponding to the region #3 are updated according to the changed bit. Furthermore, after the weighting factors for use in the search on the region #2/3 are read into the internal memory 110, the local fields related to the region #3 are updated according to the bit change in the region #2 in the immediately preceding search. Thereafter, the region #2/3 is searched.

After that, the window is similarly slid to perform a search.

Figure 17:
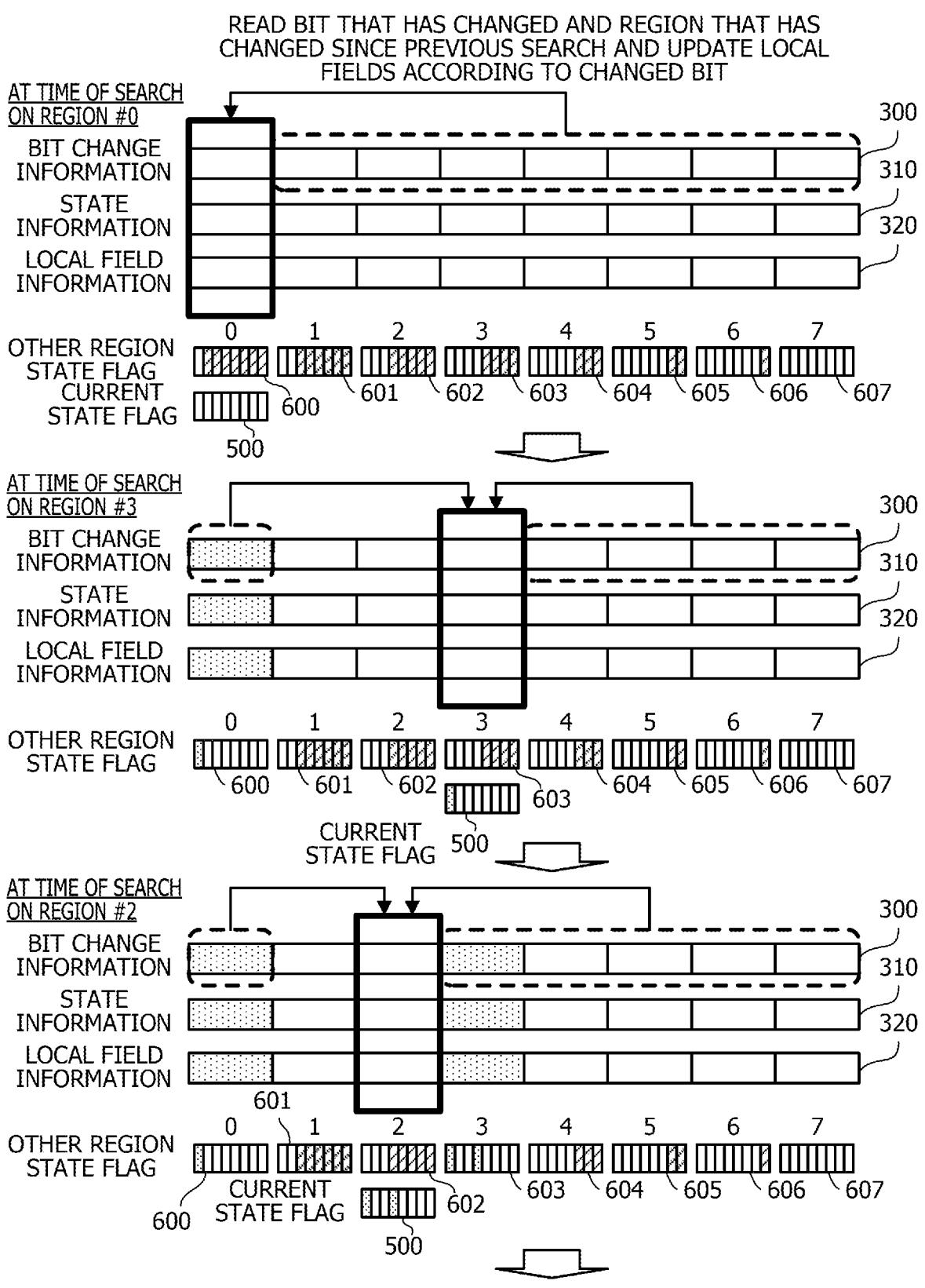
FIG. 17 is a diagram illustrating an example of random switching.

FIG. 17 is a diagram illustrating an example of random switching.

In the example in FIG. 17, one region corresponds to one window. In addition, it is assumed that searches by forward sliding have been performed on the regions #0 to #7 before reaching the search on the region #0 in FIG. 17. Then, it is assumed that the region #0 is searched again, and thereafter, the search regions are randomly switched.

In this case, at the time of searching the region #0, the regions #1 to #7 that have changed since the previous search on the region #0 are specified according to the comparison between the current state flag 500 and the other region state flag 600. Then, the weighting factors corresponding to a bit that has changed since the previous search on the region #0 among the regions #1 to #7 are read into the internal memory 110, based on the bit change information 300 and the state information 310 corresponding to the region #0. Furthermore, the local fields corresponding to the region #0 are updated according to the changed bit. Thereafter, the weighting factors related to the region #0 are read into the internal memory 110, and the region #0 is searched.

Next, the region intended to be searched is shifted to the region #3. At the time of searching the region #3, the regions #0 and #4 to #7 that have changed since the previous search on the region #3 are specified according to the comparison between the current state flag 500 and the other region state flag 603. Then, the weighting factors corresponding to a bit that has changed since the previous search on the region #3 among the regions #0 and #4 to #7 are read into the internal memory 110, based on the bit change information 300 and the state information 310 corresponding to the region #3. Furthermore, the local fields corresponding to the region #3 are updated according to the changed bit. Thereafter, the weighting factors related to the region #3 are read into the internal memory 110, and the region #3 is searched.

Next, the region intended to be searched is shifted to the region #2. At the time of searching the region #2, the regions #0 and #3 to #7 that have changed since the previous search on the region #2 are specified according to the comparison between the current state flag 500 and the other region state flag 602. Then, the weighting factors corresponding to a bit that has changed since the previous search on the region #2 among the regions #0 and #3 to #7 are read into the internal memory 110, based on the bit change information 300 and the state information 310 corresponding to the region #2. Furthermore, the local fields corresponding to the region #2 are updated according to the changed bit. Thereafter, the weighting factors related to the region #2 are read into the internal memory 110, and the region #2 is searched.

After that, similarly, the windows, that is, the regions intended to be searched are randomly switched to perform searches.

Next, an example in which the local field update in FIG. 8 is performed on a plurality of replicas in a pipeline will be described.

Figure 18:
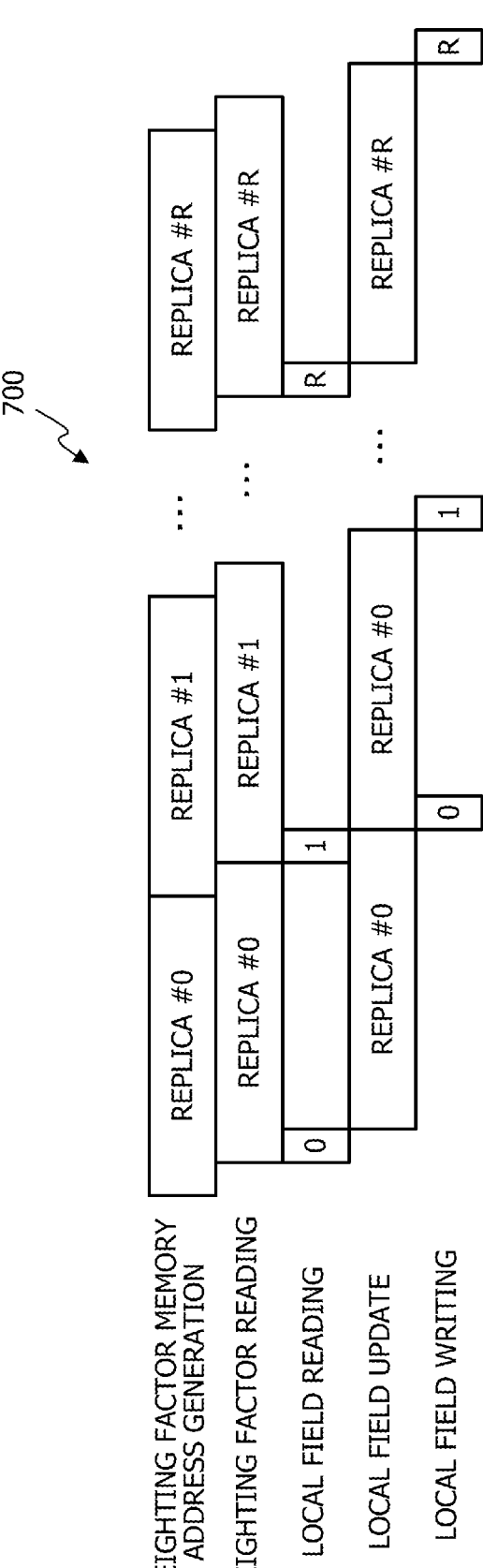
FIG. 18 is a diagram illustrating an example of pipeline processing for local field update in a plurality of replicas.

FIG. 18 is a diagram illustrating an example of pipeline processing for local field update in a plurality of replicas.

A time chart 700 illustrates an example in which the local field update procedure in FIG. 8 is processed in a pipeline with R replicas. In the local field update, the weighting factors are read into the internal memory 110 regarding the state variable that has changed from the previous time, and the local field h is updated by adding $W_{ij}\Delta x_j$ to h as in formula (6). Normally, since the number of state variables that have changed varies depending on the replicas, the number of cycles taken for the local field update process, that is, the number of repetitions of steps S32 to S34 varies for each replica.

For the sake of simplicity, the time chart 700 illustrates an example in which the delay of the pipeline has four stages, and the local field acquisition at the third stage is processed at the same timing as the weighting factor reading at the second stage. The weighting factor memory address generation at the first stage is a process of calculating the address of the weighting factor intended to be read, from the bit change information 300. The weighting factor reading at the second stage is a process of acquiring the weighting factor from the internal memory 110, based on the calculated address. The local field reading at the third stage is a process of acquiring the local fields of the corresponding replica from the internal memory 110. The local field update at the fourth stage is a process of updating the local field by adding $W_{ij}\Delta x_j$ to the acquired local field. The local field writing at the fifth stage is a process of writing the updated local field into the internal memory 110.

In each stage of the pipeline, when processing for a certain replica is finished, the search unit 130 shifts to processing for the next replica. In this way, the update of the plurality of replicas in the local field update is speeded up.

Next, an example of a memory map of the weighting factors in the DRAM 102 will be described.

Figures 19A, 19B:
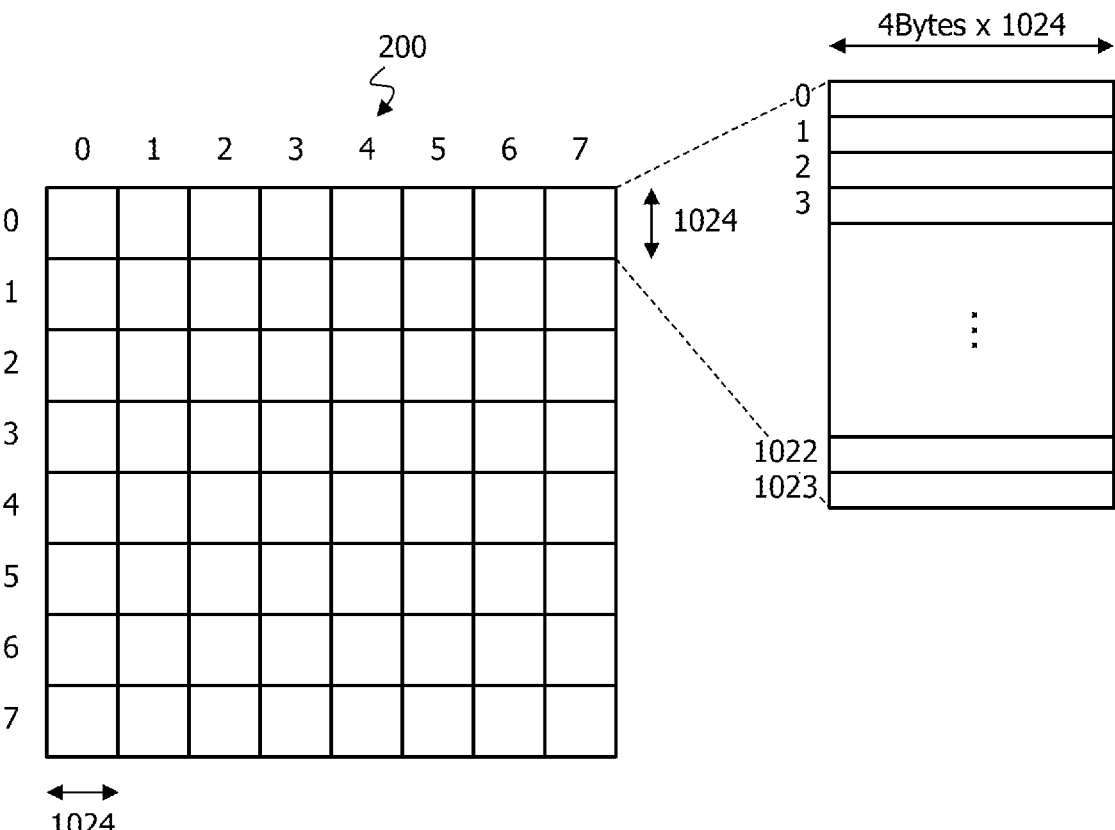
FIGS. 19A and 19B are diagrams illustrating an example of a memory map of weighting factors on a dynamic random access memory (DRAM)

FIGS. 19A and 19B are diagrams illustrating an example of a memory map of the weighting factors on a DRAM.

FIG. 19A illustrates a two-dimensional logical image of the weighting factor matrix 200. FIG. 19B illustrates a memory map 800 of the DRAM 102. In the example in FIGS. 19A and 19B, one piece of data of the weighting factor is assumed to have 4 bytes, and the problem size, that is, the number of all state variables is assumed to have 8 kilo(K)bits.

For example, when the minimum granularity of the sliding window processing is assumed to be in units of 1 Kbits, the region unit of the weighting factors in the two-dimensional logical image is treated as 1 K×1 K.

The weighting factor data desired for the local field update is data having an amount equal to one row corresponding to the changed state variable in the weighting factor matrix 200. Therefore, data having an amount equal to one row in 1 K×1 K as the minimum granularity, that is, 4 bytes×1024=4 Kbytes are placed on the memory map 800 so as to be read in a burst.

The expression of (x, y) in the memory map 800 denotes an index of x and y coordinates of the weighting factor matrix 200 in units of 1 K×1 K. For example, when weighting factors having an amount equal to 2 Kbits of 0 and 1 is to be read, desired data is read from regions of (0, 0)+(0, 1), (1, 0)+(1, 1), . . . , (7, 0)+(7, 1). With such a memory map 800, only the weighting factors desired for updating the local fields may be efficiently read from the DRAM 102.

Incidentally, the Ising machine 100 can be used by being incorporated in an information processing system. Next, an example of an information processing system including the Ising machine 100 will be described.

Figure 20:
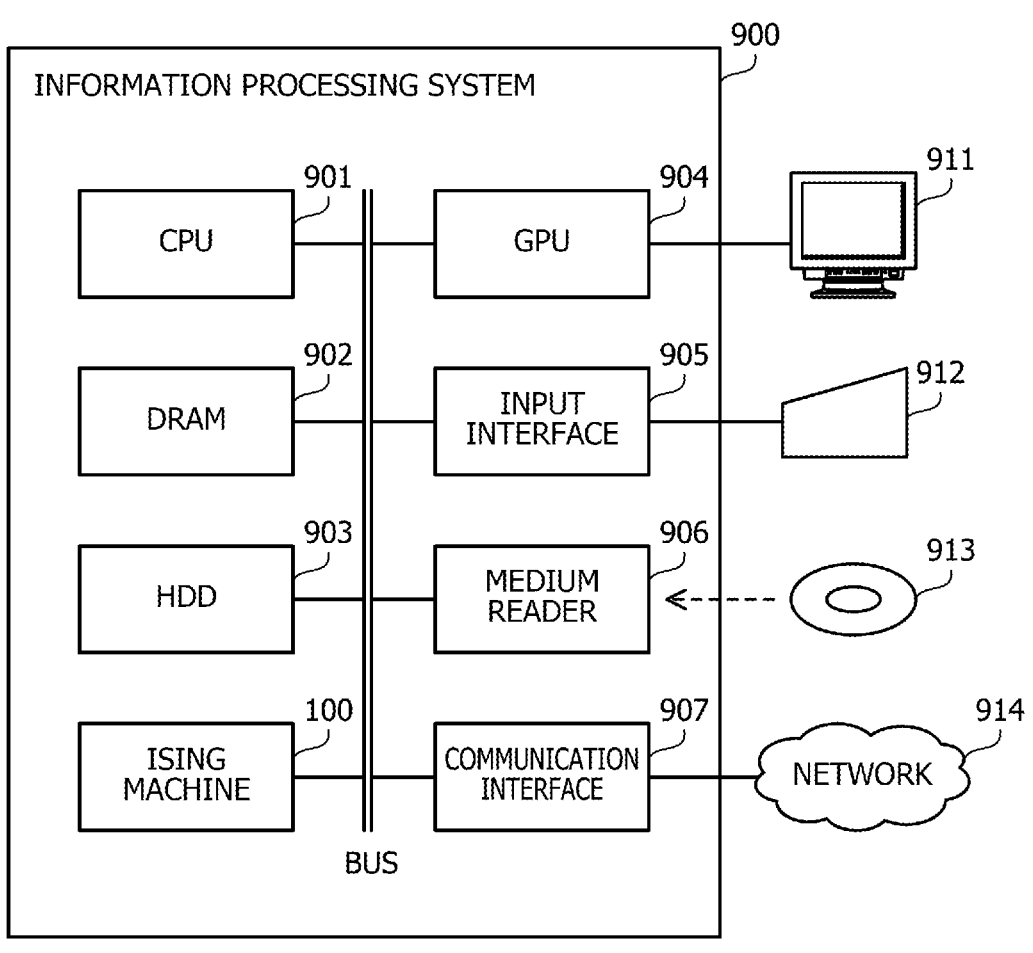
FIG. 20 is a diagram illustrating an example of an information processing system.

FIG. 20 is a diagram illustrating an example of the information processing system.

An information processing system 900 includes a CPU 901, a DRAM 902, a hard disk drive (HDD) 903, a GPU 904, an input interface 905, a medium reader 906, a communication interface 907, and the Ising machine 100. These units included in the information processing system 900 are coupled to a bus inside the information processing system 900.

The CPU 901 is a processor that executes program instructions. The CPU 901 loads at least a part of a program and data stored in the HDD 903 into the DRAM 902 and executes the program. Note that the CPU 901 may include a plurality of processor cores. In addition, the information processing system 900 may include a plurality of processors. Processing to be described below may be executed in parallel using a plurality of processors or processor cores. In addition, a set of the plurality of processors will be sometimes referred to as a "multiprocessor" or simply a "processor".

The DRAM 902 is a volatile semiconductor memory that temporarily stores the program to be executed by the CPU 901 and data to be used by the CPU 901 for arithmetic operations. Note that the information processing system 900 may include a memory of a type other than the RAM or may include a plurality of memories.

The HDD 903 is a nonvolatile storage device that stores software programs such as an operating system (OS), middleware, and application software, and data. Note that the information processing system 900 may include other types of storage devices such as a flash memory and a solid state drive (SSD) and may include a plurality of nonvolatile storage devices.

The GPU 904 outputs an image to a display 911 coupled to the information processing system 900 in accordance with an instruction from the CPU 901. As the display 911, any type of display such as a cathode ray tube (CRT) display, a liquid crystal display (LCD), a plasma display, or an organic electro-luminescence (OEL) display can be used.

The input interface 905 acquires an input signal from an input device 912 coupled to the information processing system 900 and outputs the acquired input signal to the CPU 901. As the input device 912, a pointing device such as a mouse, a touch panel, a touch pad, or a trackball, a keyboard, a remote controller, a button switch, or the like can be used. In addition, a plurality of types of input devices may be coupled to the information processing system 900.

The medium reader 906 is a reading device that reads a program and data recorded in a recording medium 913. As the recording medium 913, for example, a magnetic disk, an optical disc, a magneto-optical (MO) disk, a semiconductor memory, or the like can be used. The magnetic disk includes a flexible disk (FD) and an HDD. The optical disc includes a compact disc (CD) and a digital versatile disc (DVD).

The medium reader 906 copies, for example, a program and data read from the recording medium 913 to another recording medium such as the DRAM 902 or the HDD 903. The read program is executed by, for example, the CPU 901. Note that the recording medium 913 may be a portable recording medium and is sometimes used for distribution of the program and data. In addition, the recording medium 913 and the HDD 903 will be sometimes referred to as computer-readable recording media.

The communication interface 907 is coupled to a network 914 and communicates with another information processing device via the network 914. The communication interface 907 may be a wired communication interface coupled to a wired communication device such as a switch or a router or may be a wireless communication interface coupled to a wireless communication device such as a base station or an access point.

In the information processing system 900, the Ising machine 100 is used as an accelerator that quickly executes solution finding for a combinatorial optimization problem in accordance with an instruction from the CPU 901. However, the CPU 901 may exhibit a function similar to the function of the Ising machine 100, by executing a program stored in the DRAM 902. In this case, for example, a cache memory for the CPU 901 may be used as the internal memory, and the DRAM 902 may be used as the storage device that holds the whole weighting factors.

For example, the information processing system 900 may be considered as an example of the data processing device 10 of the first embodiment. Alternatively, when the processing of the Ising machine 100 of the second embodiment is executed by the CPU 901, an information processing device including the CPU 901, the cache memory for the CPU 901, and the DRAM 902 can be considered as an example of the data processing device 10 of the first embodiment.

As described above, according to the Ising machine 100 of the second embodiment, only the data desired at minimum for the local field update may be read at the time of switching between the windows, and the overhead of the data transfer and the local field update may be suppressed. In addition, by recurrently using the internal memory 110 for use in storing the weighting factors of the search regions, the local field update at the time of switching between the windows may be enabled without increasing the internal memory 110. In addition, a plurality of replicas may also be collectively and efficiently processed.

It can also be said that the Ising machine 100 of the second embodiment executes the following processing.

The processor 101 searches for a solution to a problem represented by the Ising model including a plurality of state variables by switching to each of a plurality of groups obtained by dividing the plurality of state variables. When switching the object intended to be searched to the first group among the plurality of groups, the processor 101 acquires the bit change information 300 indicating a state variable whose value has changed by a search on another group apart from the first group after a previous search on the first group. Based on the bit change information 300, the processor 101 reads the first weighting factors corresponding to pairs of the state variable and each of a plurality of first state variables belonging to the first group, from the DRAM 102 that stores the whole weighting factors relating to the plurality of state variables, and stores the read first weighting factors in the internal memory 110. The processor 101 updates the local field of each of the plurality of first state variables, based on the first weighting factors stored in the internal memory 110. The processor 101 reads the second weighting factors corresponding to pairs of the first state variables within the plurality of first state variables from the DRAM 102 and stores the read second weighting factors in the internal memory 110. The processor 101 executes a search on the first group, using the second weighting factors and the local field of each of the plurality of first state variables stored in the internal memory 110. After ending the search on the first group, the processor 101 updates the change information according to the presence or absence of a change in the value of each of the plurality of first state variables by the current search and switches the object intended to be searched to the next group.

This may enable to efficiently switch between groups of state variables intended to be searched. For example, if the bit change information 300 is not used, a relatively large number of weighting factors will be read for the calculation of formulas (10) and (11) due to switching between the subproblems, that is, switching between the groups intended to be searched. On the other hand, by using the bit change information 300, only the weighting factors desired at minimum for use in the local field update may be read from the DRAM 102 at the time of the switching, and the overhead produced by reading of the weighting factors or the local field update due to switching between the groups intended to be searched may be reduced. As a result, the solution performance of the Ising machine 100 may be improved. For example, the time for finding a solution may be shortened. In addition, the possibility of obtaining a better solution in a relatively short time may be enhanced. In addition, by recurrently using the storage area of the internal memory 110 for use for the weighting factors, that is, the weighting factor storage unit 131, the local field update at the time of the switching may be enabled without increasing the internal memory 110.

Note that the processor 101 is an example of the processing unit 12. The internal memory 110 is an example of the storage unit 11. The DRAM 102 is an example of the storage device 20. The bit change information 300 is an example of the change information 31.

In addition, some state variables belonging to each of the first group and a second group searched immediately before the first group may duplicate each other. In this case, after storing the second weighting factors in the internal memory 110, the processor 101 updates the local fields of some other state variables of the first group that do not duplicate the second group, based on the second weighting factors stored in the internal memory 110 and a change in the value of the state variable included in some state variables at the immediately preceding search on the second group.

This may enable to properly update the local fields corresponding to a portion of the plurality of first state variables that does not duplicate a plurality of second state variables. In addition, a group intended to be searched for a solution may be flexibly set.

In addition, the processor 101 may select the next group intended to be searched in a predetermined order or randomly.

This may enable to flexibly set a group intended to be searched for a solution. Note that, in this case, for example, information including the bit change information 300, the current state flag 500, and the other region state flags 600 to 607 may be considered as an example of the change information 31. In addition, the predetermined order is an order according to the indices of the state variables, such as the ascending or descending order of the indices as an example. Note that the number of groups intended to be searched at a time may be one or may be two or more.

In addition, the DRAM 102 may store the bit change information 300, the local field of each of the plurality of state variables, and the state information 310 indicating the values of the plurality of first state variables after the previous search on the first group. In this case, when searching the first group, the processor 101 reads the bit change information 300, the local field of each of the plurality of first state variables, and the state information 310 into the internal memory 110 from the DRAM 102. The processor 101 updates the local field of each of the plurality of first state variables, based on the direction of change in the value of the state variable specified from the bit change information 300 and the state information 310, which is the direction of change in the value of the state variable of another group whose value has changed after the previous search on the first group, and the first weighting factors. After ending the search on the first group, the processor 101 updates the bit change information 300 stored in the DRAM 102 according to the presence or absence of a change in the value of each of the plurality of first state variables by the current search. In addition, the processor 101 stores the local field of each of the plurality of first state variables after the current search and the state information 310 after the current search in the DRAM 102. The state information 310 after the current search has the latest values of the plurality of state variables in which the current search result is reflected.

This may reduce data held in the internal memory 110. In particular, the local fields and the state information after the previous search corresponding to all regions intended to be searched no longer have to be held in the internal memory 110 for all the state variables, and the storage capacity of the internal memory 110 may be saved.

Furthermore, when searching the first group for a plurality of replicas each indicating a plurality of state variables, the processor 101 may specify the first weighting factors to be read from the DRAM 102, based on the logical sum of the bit change information 301 on each of the plurality of replicas. The logical sum of the bit change information 301 corresponds to the bit change information 300*a*.

This may achieve the efficiency of reading the first weighting factors from the DRAM 102 for the plurality of replicas. For example, the reading the first weighting factors can be made faster than performing the reading individually for each replica.

Note that the information processing according to the first embodiment may be implemented by causing the processing unit 12 to execute a program. In addition, the information processing according to the second embodiment may be implemented by causing the CPU 901 to execute the program. The program can be recorded in the computer-readable recording medium 913.

For example, the program may be distributed by distributing the recording medium 913 in which the program is recorded. Alternatively, the program may be stored previously in another computer, and the program may be distributed through a network. For example, a computer may store (install) the program recorded in the recording medium 913 or the program received from another computer, in a storage device such as the DRAM 902 or the HDD 903, and read the program from the storage device to execute the read program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing device comprising:

a memory; and a processor coupled to the memory, the processor being configured to perform a search for a solution to a problem represented by an Ising model that includes a plurality of state variables, by switching to each of a plurality of groups obtained by dividing the plurality of state variables, wherein the processor performs processing including:

when switching an object intended to be searched to a first group among the plurality of groups, based on change information that indicates the state variables whose values have changed by the search on another group apart from the first group after the search at a previous time on the first group, reading first weighting factors that correspond to pairs of the state variables whose values have changed and each of a plurality of first state variables that belong to the first group, from a storage device that stores whole weighting factors that relate to the plurality of state variables, to store the read first weighting factors in the memory;

updating a local field of each of the plurality of first state variables, based on the first weighting factors stored in the memory;

reading second weighting factors that correspond to the pairs of the first state variables within the plurality of first state variables, from the storage device, to store the read second weighting factors stored in the memory;

executing the search on the first group by using the second weighting factors and the local field of each of the plurality of first state variables stored in the memory; and after ending the search on the first group, updating the change information according to presence or absence of a change in the values for each of the plurality of first state variables by the search at a current time, to switch the object intended to be searched to a next group.

2. The data processing device according to claim 1, wherein some state variables that belong to each of the first group and a second group on which the search has been performed immediately before the first group duplicate each other, and after storing the second weighting factors in the memory, the processor updates the local field of each of some other state variables of the first group that do not duplicate the second group, based on the second weighting factors stored in the memory and the change in the values of the state variables included in the some state variables at the search at an immediately preceding time on the second group.

3. The data processing device according to claim 1, wherein the processor selects the next group intended to be searched in a predetermined order or randomly.

4. The data processing device according to claim 1, wherein the storage device stores the change information, the local field of each of the plurality of state variables, and state information that indicates the values of the plurality of state variables after the search at the previous time on the first group, and the processing performed by the processor further includes:

when performing the search on the first group, reading the change information, the local field of each of the plurality of first state variables, and the state information into the memory from the storage device, and updating the local field of each of the plurality of first state variables, based on directions of change in the values of the state variables of the another group specified from the change information and the state information, and the first weighting factors; and after ending the search on the first group, updating the change information stored in the storage device according to the presence or the absence of the change in the values for each of the plurality of first state variables by the search at the current time, and storing the local field of each of the plurality of first state variables after the search at the current time and the state information after the search at the current time in the storage device.

5. The data processing device according to claim 1, wherein when performing the search on the first group for a plurality of replicas each of which indicates the plurality of state variables, the processor specifies the first weighting factors to be read from the storage device, based on a logical sum of the change information on each of the plurality of replicas.

6. A data processing method implemented by a data processing device, the data processing method comprising:

upon switching an object intended to be searched to a first group among a plurality of groups of an Ising model in a case where a search for a solution to a problem represented by the Ising model that includes the plurality of state variables is performed by switching to each of the plurality of groups obtained by dividing the plurality of state variables, based on change information that indicates the state variables whose values have changed by the search on another group apart from the first group after the search at a previous time on the first group, reading first weighting factors that correspond to pairs of the state variables whose values have changed and each of a plurality of first state variables that belong to the first group, from a storage device that stores whole weighting factors that relate to the plurality of state variables, to store the read first weighting factors in a memory;

updating a local field of each of the plurality of first state variables, based on the first weighting factors stored in the memory;

reading second weighting factors that correspond to the pairs of the first state variables within the plurality of first state variables, from the storage device, to store the read second weighting factors in the memory;

executing the search on the first group by using the second weighting factors and the local field of each of the plurality of first state variables stored in the memory; and after ending the search on the first group, updating the change information according to presence or absence of a change in the values for each of the plurality of first state variables by the search at a current time, to switch the object intended to be searched to a next group.

7. A non-transitory computer-readable recording medium storing a data processing program for causing a computer to perform processing comprising:

upon switching an object intended to be searched to a first group among a plurality of groups of an Ising model in a case where a search for a solution to a problem represented by the Ising model that includes the plurality of state variables is performed by switching to each of the plurality of groups obtained by dividing the plurality of state variables, based on change information that indicates the state variables whose values have changed by the search on another group apart from the first group after the search at a previous time on the first group, reading first weighting factors that correspond to pairs of the state variables whose values have changed and each of a plurality of first state variables that belong to the first group, from a storage device that stores whole weighting factors that relate to the plurality of state variables, to store the read first weighting factors in a memory;

updating a local field of each of the plurality of first state variables, based on the first weighting factors stored in the memory;

reading second weighting factors that correspond to the pairs of the first state variables within the plurality of first state variables, from the storage device, to store the read second weighting factors in the memory;

executing the search on the first group by using the second weighting factors and the local field of each of the plurality of first state variables stored in the memory; and after ending the search on the first group, updating the change information according to presence or absence of a change in the values for each of the plurality of first state variables by the search at a current time, to switch the object intended to be searched to a next group.

* * * * *